(12) United States Patent
Ohta et al.

(10) Patent No.: US 6,975,418 B1
(45) Date of Patent: Dec. 13, 2005

(54) COPYING MACHINE, IMAGE PROCESSING APPARATUS, IMAGE PROCESSING SYSTEM AND IMAGE PROCESSING METHOD

(75) Inventors: Kenichi Ohta, Kawasaki (JP); Akihiro Usami, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/515,610

(22) Filed: Feb. 29, 2000

(30) Foreign Application Priority Data

Mar. 2, 1999 (JP) .................................. 11-054589

(51) Int. Cl.⁷ .......................... G06F 15/00; H04N 1/46; H04N 1/00; G03F 3/08

(52) U.S. Cl. ..................... 358/1.15; 358/504; 358/406; 358/518; 358/521

(58) Field of Search ........................ 356/518; 382/167, 382/154, 162; 399/45, 48, 49; 358/500, 504, 358/518, 520, 115, 1.9, 1.6, 405, 434, 1.15, 358/406, 521

(56) References Cited

U.S. PATENT DOCUMENTS

| | | | |
|---|---|---|---|
| 5,946,457 A | * | 8/1999 | Nakai et al. ................ 358/1.13 |
| 6,035,103 A | * | 3/2000 | Zuber .......................... 358/1.9 |
| 6,043,909 A | * | 3/2000 | Holub ......................... 358/504 |
| 6,048,117 A | * | 4/2000 | Banton .................. 400/120.09 |
| 6,172,771 B1 | * | 1/2001 | Ikeda et al. ................. 358/406 |
| 6,256,107 B1 | * | 7/2001 | Toda .......................... 358/1.15 |
| 6,404,511 B1 | * | 6/2002 | Lin et al. .................... 358/504 |
| 6,417,938 B1 | * | 7/2002 | Hsu et al. ................... 358/509 |

* cited by examiner

Primary Examiner—Edward Coles
Assistant Examiner—Chan S. Park
(74) Attorney, Agent, or Firm—Fitzpatrick, Cella, Harper & Scinto

(57) ABSTRACT

In a copying machine connected to the network, calibrations on the printers are performed as follows. When an execution of calibration is requested, the copying machine displays all identification numbers of the printers connected to the network on the operation panel of the copying machine. When the user selects a printer to be calibrated through the display, the copying machine causes the selected printer to output a specified test pattern. Then the copying machine reads the test pattern, generates a correction table and registers the generated table with the printer.

16 Claims, 20 Drawing Sheets

DOCUMENT ON APPLICATION

EXAMPLES OF PDL COMMAND

- CIRCLE / COLOR = GRAY / SIZE = 100 / POSITION = x ; 20, y ; 40
- RECTANGLE / COLOR = WHITE / SIZE = 40x30 / POSITION = x ; 25, y ; 45
- CHARACTER / CHARACTER LINE "ABC" / SIZE = 15 POINT / COLOR = BLACK / POSITION = x ; 50, y ; 50
- IMAGE / SIZE = 50x30 / POSITION = x ; 30, y ; 5 / IMAGE DATA = FFA032D0 . . . 807236CAB0680EF5 /

BIT MAP IMAGE ON IMAGE MEMORY

| No. 1 | | | |
|---|---|---|---|
| DOCUMENT NAME | STATUS | OWNER | SITUATION |
| A | PRINTING | B | *** |

FIG.14B

COPYING MACHINE, IMAGE PROCESSING APPARATUS, IMAGE PROCESSING SYSTEM AND IMAGE PROCESSING METHOD

This application is based on Patent Application No. 11-054589 (1999) filed Mar. 2, 1999 in Japan, the content of which is incorporated hereinto by reference.

BACKGROUND OF THE INVENTION

1. Field of the Invention

The present invention relates to a copying machine, an image processing apparatus, an image processing system and an image processing method and more specifically to a calibration for an image outputting apparatus, such as a printer, connected through a network to the image processing system.

2. Description of the Prior Art

In recent years, a personal computer and a peripheral, such as printers, used in combination with the personal computers, have come into wide use. Under this circumstance, documents and graphic images generated on a computer can easily be output as hard copies.

As a representative configuration of such a system, that shown in FIG. 1 is known. The figure shows an outline configuration of the system in which, for example, page layout documents such as documents by desktop publishing (DTP), documents by word processor and graphic documents are made by means of a host computer 1001 and they are printed out by an image outputting apparatus 1007 such as laser beam printers, ink jet printers and the like.

In FIG. 1, denoted by 1002 is an application operating on the host computer which typically includes word processor software such as Word of Microsoft Corp. and page layout software such as PageMaker® of Adobe Systems.

Digital documents made by the software are handed over to a printer driver 1003 through an operating system (OS), not shown, in the computer. The digital document is a set of command data which normally represents, for example, figures and characters that make up data of a page. These commands are transferred to the printer driver 1003. The commands are, in many cases, written in a language system called PDL (page description language). As the representative PDLs, GDI and PS (Postscript) are known. The printer driver 1003 transfers the received PDL commands to a rasterizer 1005 in a raster image processor 1004. The rasterizer 1005 develops characters and figures represented by the PDL commands into a two-dimensional bit map image used for actual printing out by the printer. More specifically, the bit map image is an image formed by filling a two-dimensional plane with repeated one-dimensional rasters (lines). The bit map image thus developed is stored temporarily in an image memory 1006.

FIG. 2 is an illustration schematically illustrating the processing above. A document image displayed by the application 1002 on the host computer 1001 is transferred to the rasterizer 1005 as a PDL command series via the printer driver 1003. The rasterizer 1005 maps the two-dimensional bit map image 1104, 1105, and 1106 onto the image memory 1006.

The mapped image data is sent to the color printer 1007. The color printer 1007 has an image forming unit 1008, as shown in FIG. 1, such as a known electro-photographic system or ink jet system and forms a visual image on a paper to perform printing out. The image data in the image memory is transferred to the color printer in synchronism with a synchronization signal, a clock signal or a particular color component signal transfer request, all of which is not shown and is necessary to operate the image forming unit.

In the image outputting apparatus such as the printer, which is used for outputting an image in the above-described conventional system, it is known that the hue and density of a printed image may change when printing operation is performed for a long period. This is due to a change with elapsing of time in image outputting characteristics of the printer and to increased variations in respective parts composing the printer. Also, the printer generally has individuality in the above-described change in the image outputting characteristic including the cause thereof, that is, the change with elapsing of time and soon. In this case, there may be caused a problem that, for example, a plurality of printers connected to the image processing system perform printing with different hue or the like.

For example, for the printer using the electro-photographic system as the image forming unit, the electro-photographic processes which include an exposure to a laser beam for formation of a latent image on a photosensitive body, development of the latent image with a toner, transfer of the toner image onto output medium such as a paper, and fixing of the toner image on the medium by heat, are easily influenced by ambient temperature and humidity or by change with elapsing of time in components realizing the electro-photographic processes. As a result of this, a change in the amount of toner fixed on the paper is brought to cause change in the hue or density of the printed image.

It is known that such a change in the image outputting characteristic is not peculiar to the electro-photographic system but can also occur similarly with various other printing systems such as ink jet system, heat transfer system and thermo-sensitive system.

As a configuration to solve such a problem, a system shown in FIG. 3 has been known. In this system, the printer 1007 outputs a test pattern image 1201 made up of predetermined patches 1202, 1203, 1204, 1205, the density of the output test pattern image is measured, and based on the measurement, the outputting characteristic of the image forming unit is corrected. Such processing is called a calibration. The calibration process in detail will be explained below.

When the calibration is requested, the host computer 1001 sends a test pattern output command to the raster image processor 1004. Based on the command received, the raster image processor 1004 generates bit map data for outputting and sends it to the printer 1007. The printer 1007 performs printing out based on the bit map data received on an output medium such as paper. The output pattern in this system has, as indicated by a pattern 1201, patches of four toner colors, cyan (C), magenta (M), yellow (Y) and black (K), each of which has a toner adhering area rate gradually changing from 0% to 100% in eight steps. In the figure, the eight-step patches are assigned numbers from 0 to 7, and reference number 1202 represents a horizontal row of cyan patches, 1203 magenta patches, 1204 yellow patches and 1205 black patches.

The output pattern has a total of 32 patches (4 colors×8 steps), each of which is measured for density by a reflection density measuring device 1206. The measured values (density data for each patch) are sent to the host computer 1001.

The host computer 1001 compares the respective measured values with reference values for the 32 patches preliminary stored and, based on a result of the comparison, updates the content of a correction table for correcting image data of each color C, M, Y and K. The host computer then registers the updated correction table in a table conversion unit in the raster image processor. Thus, the calibration process is complete.

The table conversion unit is a correction table used by the raster image processor to correct the image data for each color when generating a bit map image. For example, when the density of a third cyan patch in the test pattern 1201 is measured and found to be lower than the reference value in the above calibration process, what the calibrated correction table does is to correct an input density value, when it is equal to the reference value corresponding to the third cyan patch, to a value higher than the reference value. This correction can make the output density characteristic of the printer closer to the reference value over the entire density range. As a result, proper printing out can be maintained with stable output density characteristic.

With the above procedure it is possible to carry out the calibration for maintaining an appropriate output density characteristic of the printer. To do so, the density measuring device as shown in FIG. 3 that measures the patches output by the printer is required.

The density measuring device used for this purpose is generally high accurate and expensive one and thus it is not realistic in view of cost to provide it on each printer. Further, there are few users who purchase such a density measuring device only for the purpose of stabilizing the output density. If the user is in a position to use the density measuring device, the user is required to perform various troublesome operations such as measuring individual patches produced by the printer in sequence and this takes much labor and time.

In the image processing system connected with the printer via network, there is another problem. That is, the user is required to start a calibration program on the host computer, perform operations associated with the calibration, move to where the printer or scanner is installed, and perform necessary operations for printing out and reading a test pattern. Further, in the image processing system connected with a plurality of printers via network, the troublesome operations described above must be performed for all the connected printers to complete the calibration and this will take huge amounts of labor and time.

As a growing number of systems in offices are operated under the networked environment, it is proposed to use not only printers but copying machines as the image outputting apparatus for the image processing system. More specifically, the copying machines are configured so that they can not only perform generally known copying functions independently of the network system but also print out image data processed by the host computer.

In view of the image processing environment described above, it is an object of the present invention to provide a copying machine, an image processing apparatus, an image processing system and an image processing method which allow easy calibration in a networked system by effectively utilizing the functions of the copying machine.

SUMMARY OF THE INVENTION

The object of the present invention is to provide a copying machine, an image processing apparatus, an image processing system and an image processing method which allows a calibration in a network system to be easily performed by employing a function of the copying machine effectively.

Another object of the present invention is to provide an image processing apparatus, an image processing system and an image processing method which allows calibration with a simple configuration.

Still another object of the present invention is to provide an image processing apparatus, an image processing system and an image processing method which, in the image processing system having a plurality of image outputting apparatus, can perform calibration on the individual image outputting apparatus with a simple configuration.

Still another object of the present invention is to provide an image processing apparatus, an image processing system and an image processing method which can prevent an accuracy of a calibration from being decreased even when a calibration process is carried out by employing an image reading section of a copying machine.

In a first aspect of the present invention, there is provided a copying machine including an image reading unit and an image output unit printing out an image read by the image reading unit as a copy, the copying machine comprising:

an operation section for performing a display through which an image output apparatus is specified, when the copying machine is connected to a network to which at least one the image output apparatus excluding the copying machine is connected;

pattern output means for causing the image output apparatus specified through the operation section to output a predetermined test pattern; and correction data generation means for causing the image reading unit to read the predetermined pattern output by the image output apparatus specified through the operation section and generating correction data used for correcting an image output condition for the image output apparatus specified, based on a result of reading by the image reading unit, wherein data for correcting the image output condition of the image output apparatus is updated with the correction data generated by the correction data generation means.

In a second aspect of the present invention, there is provided an image processing system comprising:

image reading means for reading an image;

display means for performing a display for specifying an image output apparatus connected to a network;

input means for executing input for specifying the image output apparatus displayed by the display means; and calibration means for controlling an image output condition for the image output apparatus specified by the input through the input means, based on read data read by the image reading means.

In a third aspect of the present invention, there is provided an image processing system comprising:

image reading means for reading an image;

control means for controlling an operation of each of a plurality of image output apparatuses connected to a network;

specifying means for specifying at least one of the image output apparatus from the plurality of image output apparatuses; and calibration means for controlling an image output condition for the image output apparatus specified by the specifying means, based on read data read by the image reading means.

In a fourth aspect of the present invention, there is provided an image processing method of performing image processing using image reading means, comprising the steps of:

performing a display for specifying an image output apparatus connected to a network; and performing calibration for controlling an image output condition of the image output apparatus specified through the display.

In a fifth aspect of the present invention, there is provided an image processing method of performing image processing using image reading means, comprising:

a step for controlling an operation of each of a plurality of image output apparatuses connected to a network;

a step for specifying at least one of the image output apparatus from the plurality of image output apparatuses; and a step for controlling an image output condition for the image output apparatus specified by the specifying means, based on read data read by the image reading means.

In a sixth aspect of the present invention, there is provided an image processing apparatus for performing image processing using image reading means, comprising:

operation means for performing a display for specifying an image output apparatus when the image processing apparatus is connected to a network to which the image output apparatus is connected; and calibration means for controlling an image output condition of the image output apparatus specified through the operation means, based on read data read by the image reading means.

In a seventh aspect of the present invention, there is provided an image processing apparatus for performing image processing using image reading means, comprising:

control means for controlling an operation of each of a plurality of image output apparatuses when the image processing apparatus is connected to a network to which the plurality of image output apparatuses are connected;

specifying means for specifying at least one of the image output apparatus from the plurality of image output apparatus; and calibration means for controlling an image output condition of the image output apparatus specified by the specifying means, based on read data read by the image reading means.

According to the above configuration, when performing a calibration for an image outputting apparatus such as a printer connected to a network system, a user can specify through a display for an operation of a copying machine or a host computer the image outputting apparatus to be calibrated and cause the specified image outputting apparatus to output a test pattern. Further, the test pattern printed by the image outputting apparatus can be read by a reading means of the image outputting apparatus and, based on the test pattern read, the image outputting apparatus by which the test pattern is printed can be calibrated. Therefore there is no need to use a separate density measuring device to measure the density of the test pattern. Nor is it necessary to take a troublesome step of reading the test pattern with a separate scanner and transferring the read data into the image processing apparatus. Further, if the scanner is placed at a relatively remote location, the user is not required to go there for a reading operation.

The above and other objects, effects, features and advantages of the present invention will become more apparent from the following description of embodiments thereof taken in conjunction with the accompanying drawings.

BRIEF DESCRIPTION OF THE DRAWINGS

FIGS. 14A, 14B and 14C are illustrations showing displays appearing on an operation panel of a copying machine during a calibration process executed by the CPU of the copying machine in another embodiment of the present invention.

DESCRIPTION OF THE PREFERRED EMBODIMENTS

By referring to the accompanying drawings embodiments of the present invention will be described in detail.

First Embodiment

Figure 4:
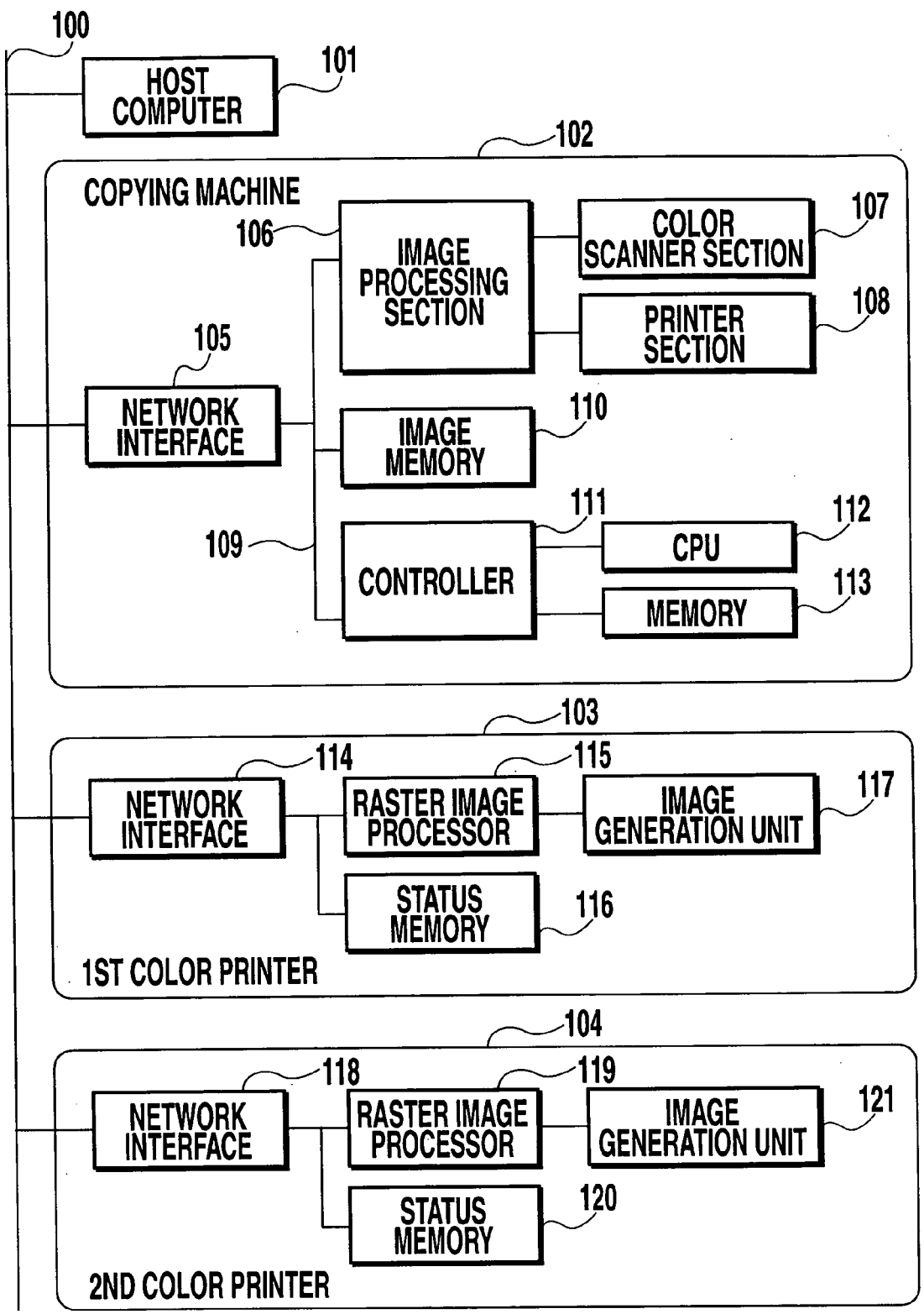
FIG. 4 is a block diagram showing a configuration of an image processing system according to one embodiment of the present invention.

FIG. 4 is a block diagram showing a configuration of an image processing system of a first embodiment of the present invention.

As shown in the figure, the image processing system of this embodiment includes a host computer 101, a copying machine 102 and two color printers 103, 104, all interconnected via a network cable 100.

The network 100 may use a so-called Ethernet which can perform giving and receiving of information and transmission of data between connected units in accordance with a TCP/IP protocol with use of a 10BaseT physical cable, for example. The image processing system shown in the figure performs printing according to the configuration shown in FIG. 1. More specifically, the host computer 101 is provided with an operation unit (not shown) such as a display, a keyboard, a mouse and so on and executes processing for outputting an image described with reference to FIG. 1 by using software such as an application and a printer driver. The copying machine 102, the first color printer 103 and the second color printer 104 in this system can perform the similar function to that of the color printer 1007 shown in FIG. 1, i.e., the function of the image outputting apparatus. The copying machine 102 is originally intended to output an image produced by copying an original image. However, similar to the printer shown in FIG. 1, the copying machine 102 can also output only an image based on data transmitted from the host computer 101 as well as the above copy outputting. In the latter case, the raster image processor for converting the image data of the PDL format into bit map data is constructed in the image processing section 106. Further, the copying machine 102 of this embodiment also functions as a host in connection with the calibration for printers 103 and 104 connected to the copying machine through the network, as described later.

Figure 1:
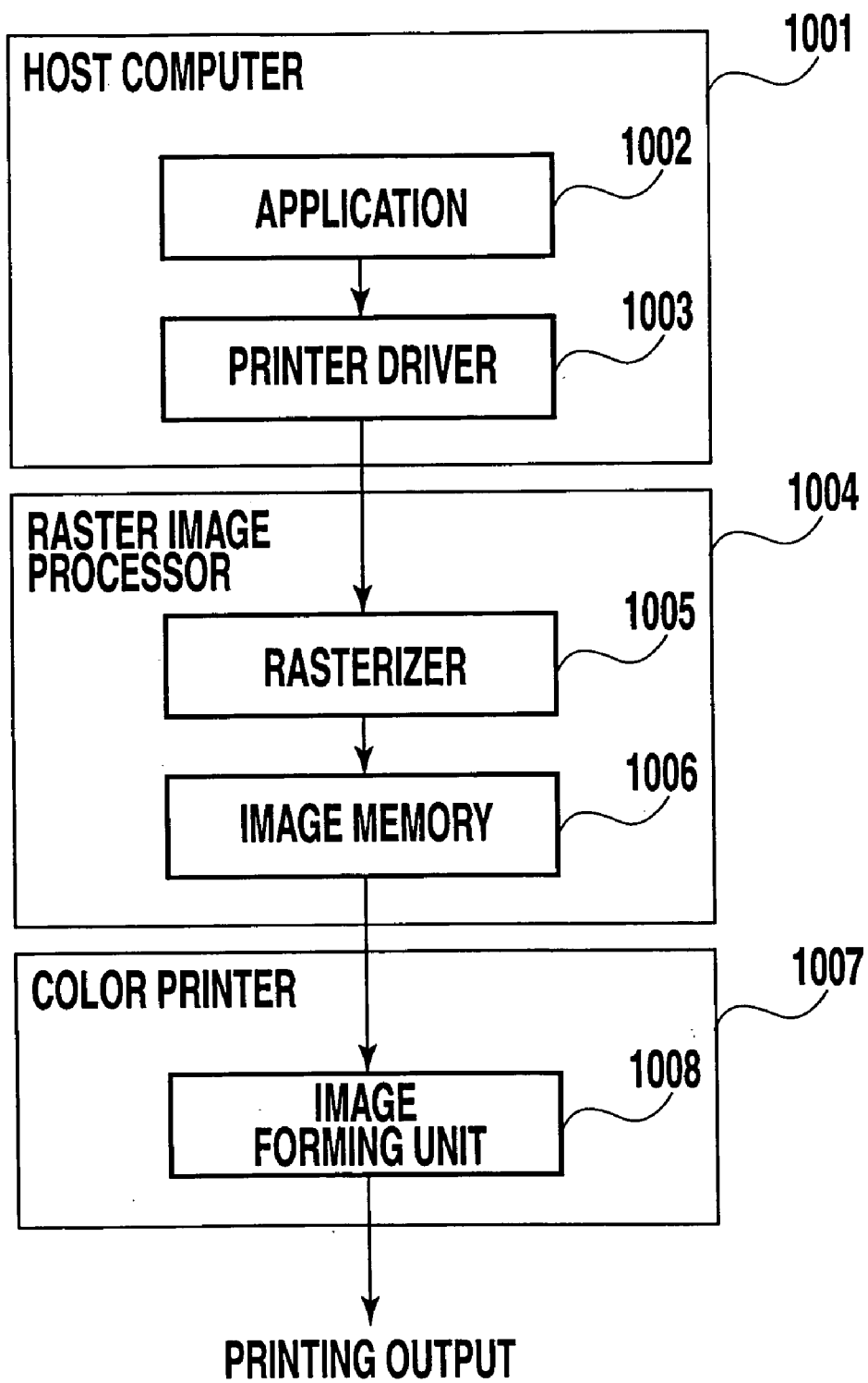
FIG. 1 is a block diagram showing a general configuration of an image processing system.
Figure 2:
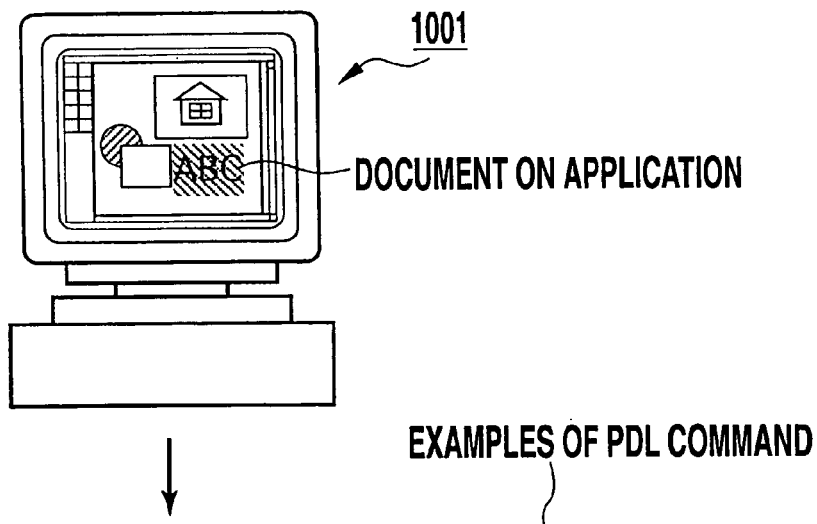
FIG. 2 is an illustration explaining a process of image data in the image processing system.
Figure 2:
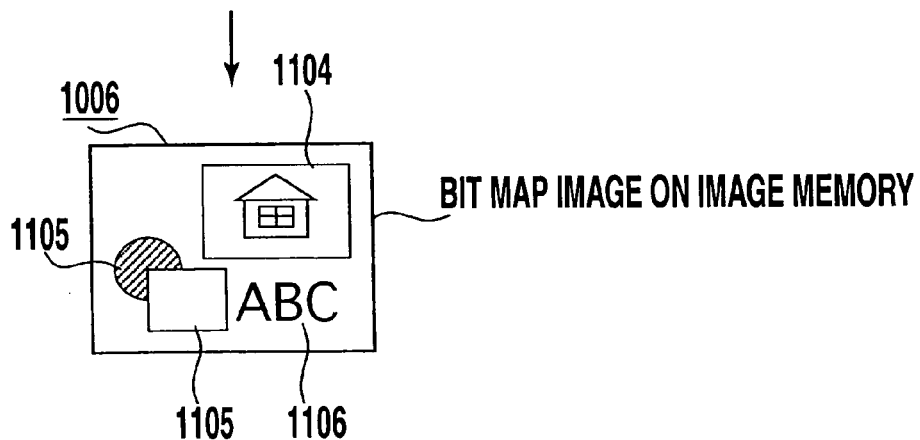

The color printers 103, 104 have the similar functions to each other and, like a printer section 108 of the copying machine 102, have image generation sections 117, 121 of electro-photographic system. The raster image processor and the image memory explained in FIG. 1 are realized in the color printers 103, 104 of this embodiment as raster image processors 115, 119 and memories not shown. These raster image processors and others may be constructed in the host computer. It should also be noted that the image outputting system in the copying machine is not limited to the electro-photographic system and may employ an ink jet system or any other system.

The host computer 101, and the copying machine 102 and color printers 103, 104 as the image outputting apparatus can transmit information and data between them by means of their respective network interfaces 105, 114 and 118.

Configuration of Copying Machine

The configuration of the copying machine 102 of this embodiment will be explained in more detail. The copying machine of this embodiment is of a digital type using a laser beam and includes the image processing section 106, an image memory 110 and a controller 111, all of which are interconnected via a bus 109 and also connected to the network 100 through the network interface 105.

The image processing section 106 is connected with a color scanner section 107 and the printer section 108. The color scanner section 107 reads an original image at a predetermined resolution of pixel density and outputs the image signal thus obtained as a digital signal. The printer unit 108 performs outputting of a hard copy on a medium such as paper based on the image signal processed by the image processing unit 106.

Usually, in the case of copying an original image, the image signal read by means of the color scanner section 107 is sent to the image processing section 106 where the image signal undergoes known image processing such as shading correction, sharpness correction, gamma correction and digitization. After these processing, the image signal is then transmitted to the printer section 108 which forms a hard copy of the original image.

Figure 5:
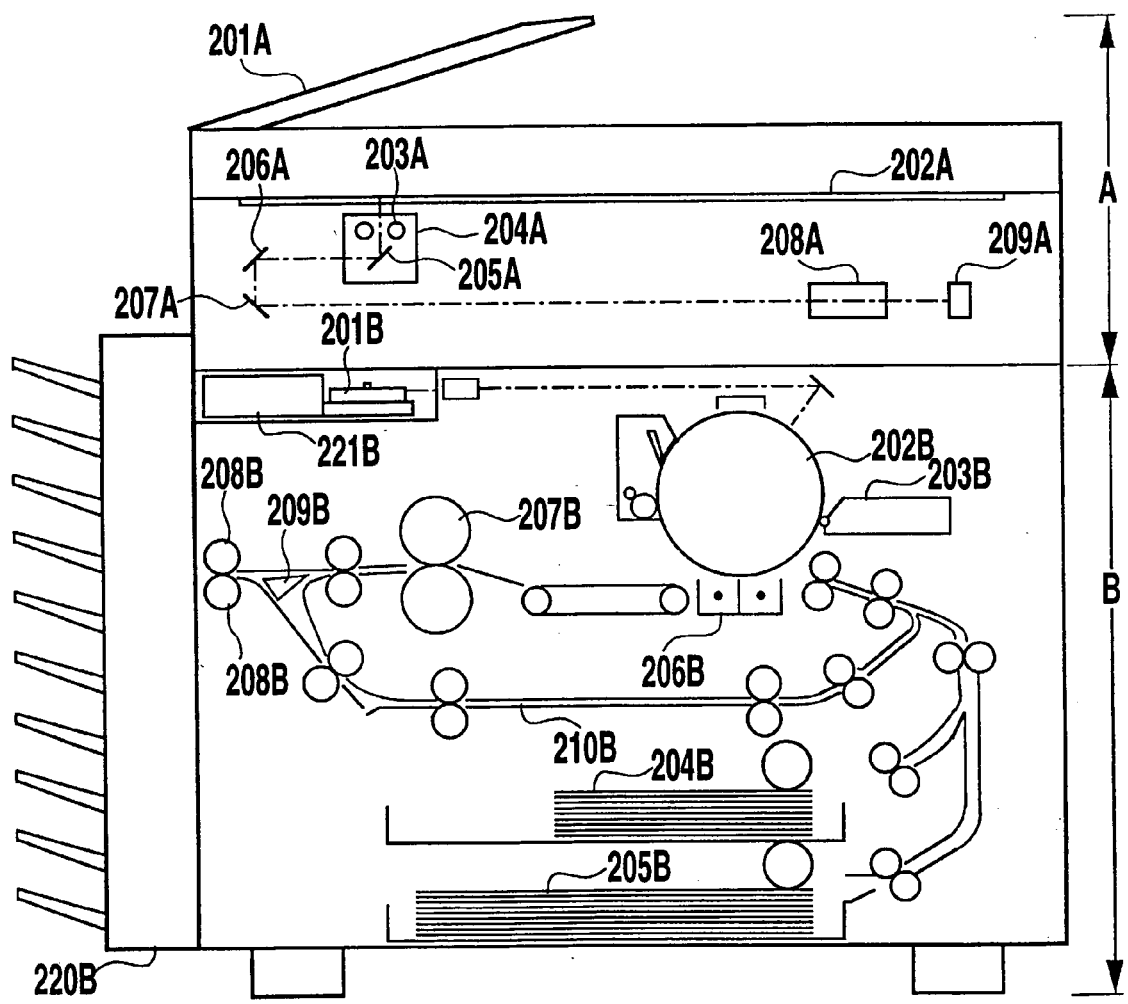
FIG. 5 is a cross section schematically showing the mechanical construction of a copying machine making up the image processing system of the embodiment.

FIG. 5 is a cross section showing a general mechanical construction of the copying machine 102 of this embodiment.

The copying machine 102, as shown in the figure, has a color scanner section A and a printer section B as a mechanical configuration.

The color scanner unit A includes a sheet feeding and transport unit 201A which feeds sheets of the original images for each sheet sequentially from a sheet of a last page, onto a platen glass 202A, and, after the original image on the sheet has been read, discharges the sheet from the platen glass 202A. When the sheet of original image is fed onto the platen glass 202A, the color scanner unit A turns on a lamp 203A and moves a scanner unit 204A mounting the lamp 203A to scan the original image on the sheet for throwing light on it. Reflected light from the sheet is guided by mirrors 205A, 206A, 207A and lens 208A to a CCD color image sensor 209A (hereinafter referred to simply as a "CCD"). The reflected light entering the CCD 209A is separated into three color components red (R), green (G) and blue (B), and is read as the luminance signals for individual colors. Further, the luminance signals output from the CCD 209A are subjected to A–D conversion so as to be entered as image data of digital signal into the image processing section 106 (see FIG. 4), where the digital image data is subjected to known image processing such as shading correction, density correction and digitization, and then transmitted to the printer unit B.

The printer unit B includes a laser driver 221B which drives a laser beam emitting unit 201B to emit a laser beam according to the image data of each color output from the image processing unit 106 (FIG. 4). The laser beam is irradiated against a photosensitive drum 202B to form a latent image corresponding to irradiation of the laser beam, on the drum. Then a toner or a developer supplied from a developing unit 203B is attracted to that part of the photosensitive drum 202B where the latent image is formed. Although FIG. 5 shows only one developer for simple illustration, it should be noted that the toner is provided for each of the C, M, Y and K colors and thus four developers are used. Instead of the above construction, four sets of photosensitive drum and developer may be provided for individual colors.

In synchronism with the start of irradiation of the laser beam, a sheet of printing paper is fed from a cassette 204B or a cassette 205B, whichever is selected, so as to be transported to a transfer portion 206B, where the developer adhering to the photosensitive drum 202B is transferred onto the printing paper. The printing paper onto which the developer has been transferred is then transported to a fixing portion 207B, where the developer is fixed to the printing paper by heat and pressure. The printing paper that has passed the fixing portion 207B is discharged by discharge rollers 208B. A sorter 220B sorts out the discharged printing paper and stores them into a corresponding bin. In the case that the sorting is not requested, the sorter 220B stores the printing sheet into the topmost bin. Further, in case that a duplex printing is specified, after the printing sheet is transported to the discharge rollers 208B, the rotation direction of the discharge rollers 208B is reversed to feed the sheet through a flapper 209B into a paper re-transport path. Furthermore, when a multiple printing is specified, the printing sheet, instead of being transported to the discharge rollers 208B, is guided by the flapper 209B into the paper re-transport path. The printing sheet guided into the paper re-transport path is fed to the transfer portion 206B at the timing described earlier. The above described process of latent image forming, developing and fixing is performed for each color and therefore a full color printing can be realized, as already known, by repeating the processes four times using the printing paper transport mechanism described above.

Referring again to FIG. 4, in the copying machine with the above mechanical construction, the image memory 110 and the controller 111 are connected to the network interface 105 through the bus 109, as described above. Through this connection configuration, the image data read by the scanner unit A, the control signal for controlling the respective sections, and the timing signal for synchronous operation are transmitted and received between the sections. The image memory 110 stores the image data received through the bus 109, and the controller 111 controls an overall operation of the system also through the bus 109. These processing are made possible by a configuration that the CPU 112 sends a control signal to the controller 111 according to a program stored in a memory 113. The CPU 112 also controls the system as a whole in connection with the calibration of this embodiment, as described later. In all cases including the case for the calibration, the respective sections of the copying machine 102 can exchange information and commands with, and transfer image data to and from, the host computer 101 and the color printers 103, 104 through the network interface 105.

A plurality of the color printers (only two printers are shown in FIG. 4) as the printers 103, 104 are connected to the image processing system of the embodiment. Each of the plurality of printers includes a network interface unit (114, 118), a raster image processor (115, 119), a status memory (116, 120) for managing the status of the printer and storing the condition in which the raster image processor performs the image processing, and an image generation unit (117, 121) of electro-photographic system. With respect to each printer, the CPU for controlling an operation of the printer and a memory for storing an image data are not shown in FIG. 4. These printers 103, 104 can output a predetermined pattern and update a correction table according to commands from the copying machine 102, at the calibration described later.

Processing or operating procedure for the calibration that can be executed on the color printers 103, 104 in the image processing system having a configuration described above will be explained below by referring to FIG. 6.

Figure 6:
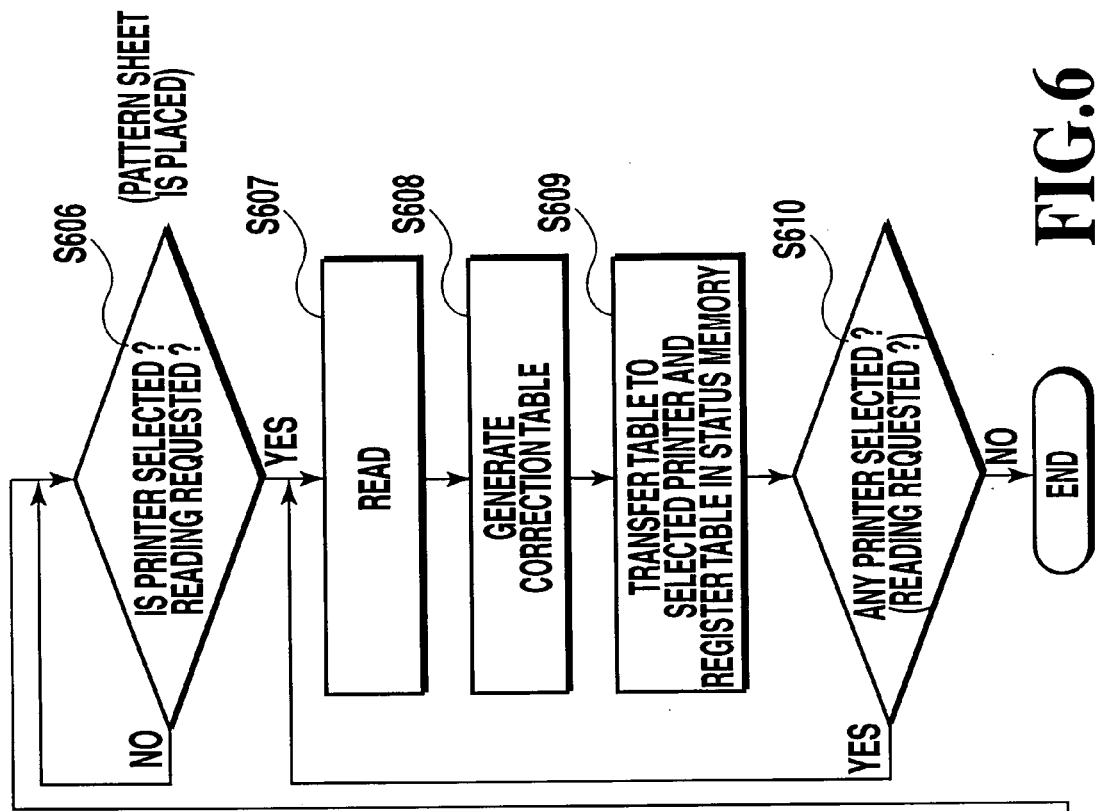
FIG. 6 is a flow chart showing a process for a calibration executed by a CPU of the copying machine in the embodiment.
Figure 6:
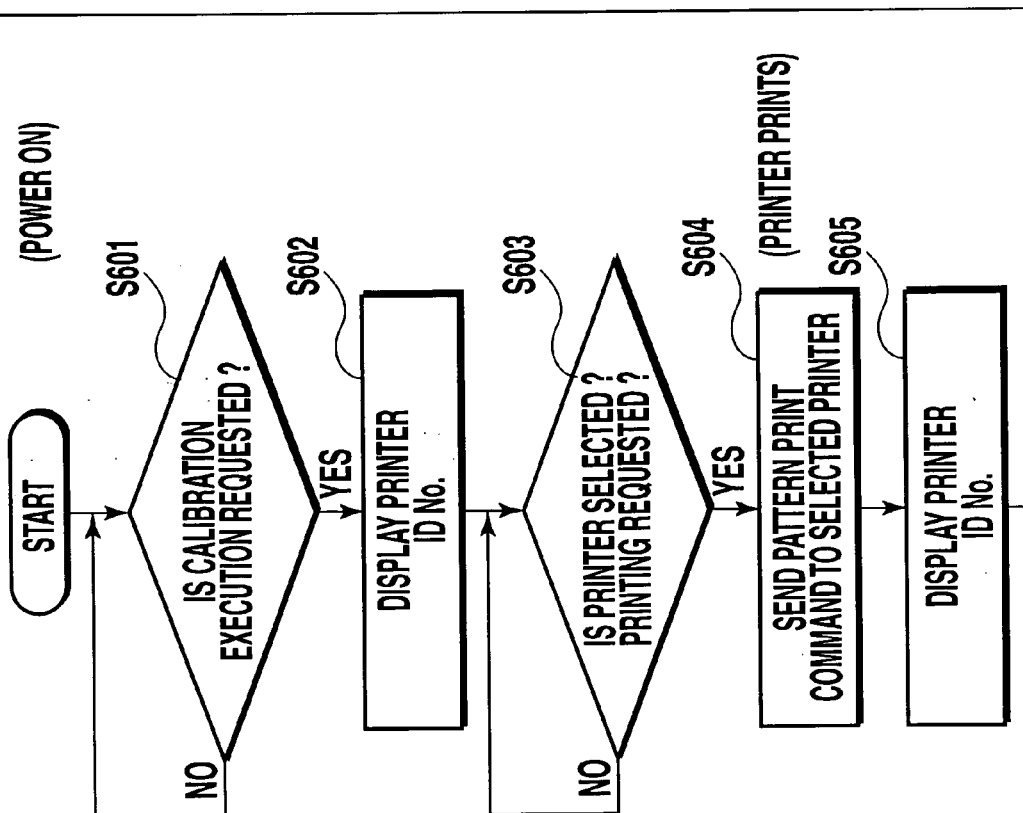

FIG. 6 is a flow chart showing sequential procedure for the calibration of this embodiment, which is executed by the CPU 112 of the copying machine 102 according to the program stored in the memory 113.

Output of Test Pattern

When a power of the copying machine 102 is turned on, the procedure is initiated. At first, at step S601 a predetermined display through which a user can command an execution of the calibration is performed on the operation panel of the copying machine 102, and then waiting a user's action for command is performed.

Figure 7A:
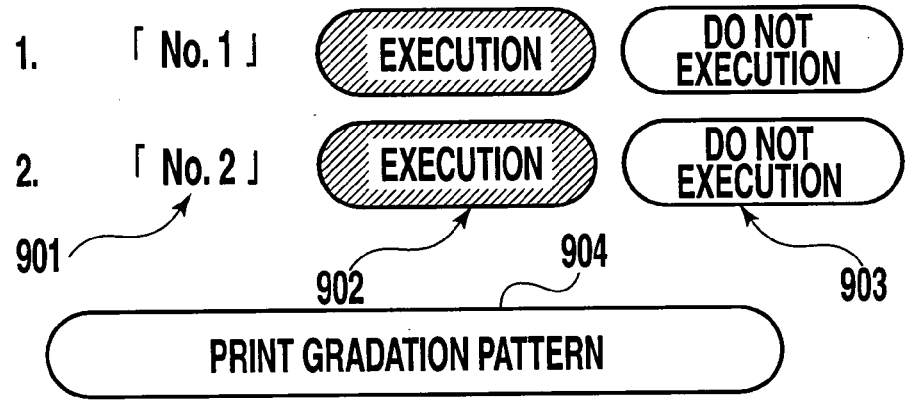
FIGS. 7A, 7B and 7C are illustrations showing displays appearing on an operation panel of the copying machine during the calibration process executed by the CPU of the copying machine in the embodiment.

When the user instructs the calibration to be executed through the display on the operation panel, a display through which the user can select the printer to be subject to the calibration (the calibration is also referred to as a "gradation correction") from the printers connected through the network is performed on the operation panel, as shown in FIG. 7A (step S602).

More specifically, the color printers connected to the network are searched for and respective printer identification codes 901 stored in the respective printer status memories 116, 120 as printer identification information are displayed on the operation panel. The user can choose a desired printer for calibration from the codes of the above display. In an example shown in the figure, it is assumed that the color printer 103 has an identification code of "No. 1" and the color printer 104 "No. 2" and that these identification codes are previously stored in the respective status memories. The CPU 112 of the copying machine controls to retrieve this information via network and display the identification codes on the operation panel.

It may be possible to use an IP address of a printer in the network as the printer identification information.

As shown in FIG. 7A, on the operation display panel are displayed the printer identification codes (printer names) 901 that are available for use, and for each identification code, selection buttons 902, 903 for specifying the execution of the gradation correction. The buttons of a liquid crystal display are of a touch panel type and the user can choose either "execution" (button 902) or "Do not execution" (button 903). The selected button turns into highlighted characters, indicating that the bottom has been selected. In the example shown, "execution" is selected for both printers, and in default "execution" is automatically selected. That is, when the user does not make any particular selection, all the printers connected through the network are automatically selected for the calibration.

After the above selection operation completed, pressing a "Print gradation pattern" button 904 starts the printing of a gradation pattern. More specifically, when at step S603 it is decided that the printer selection is done and then the instruction for printing of the predetermined gradation pattern is done, at step S604 a gradation pattern output command of PDL is transmitted to a selected printer. In response to this command, the selected printer prints the gradation pattern. As described above, the number of printers selected may be one or two or more. When two or more printers are selected, the same gradation pattern output command can be issued simultaneously to these printers.

Both or one of the selected printers 103, 104 receive gradation pattern data with the output command via the network interfaces 114 and/or 118, develop the data into a bit map image and output it from the image forming units 117 and/or 121, thus printing out the gradation pattern described later by referring to FIG. 8.

Type of Test Pattern

Figure 3:
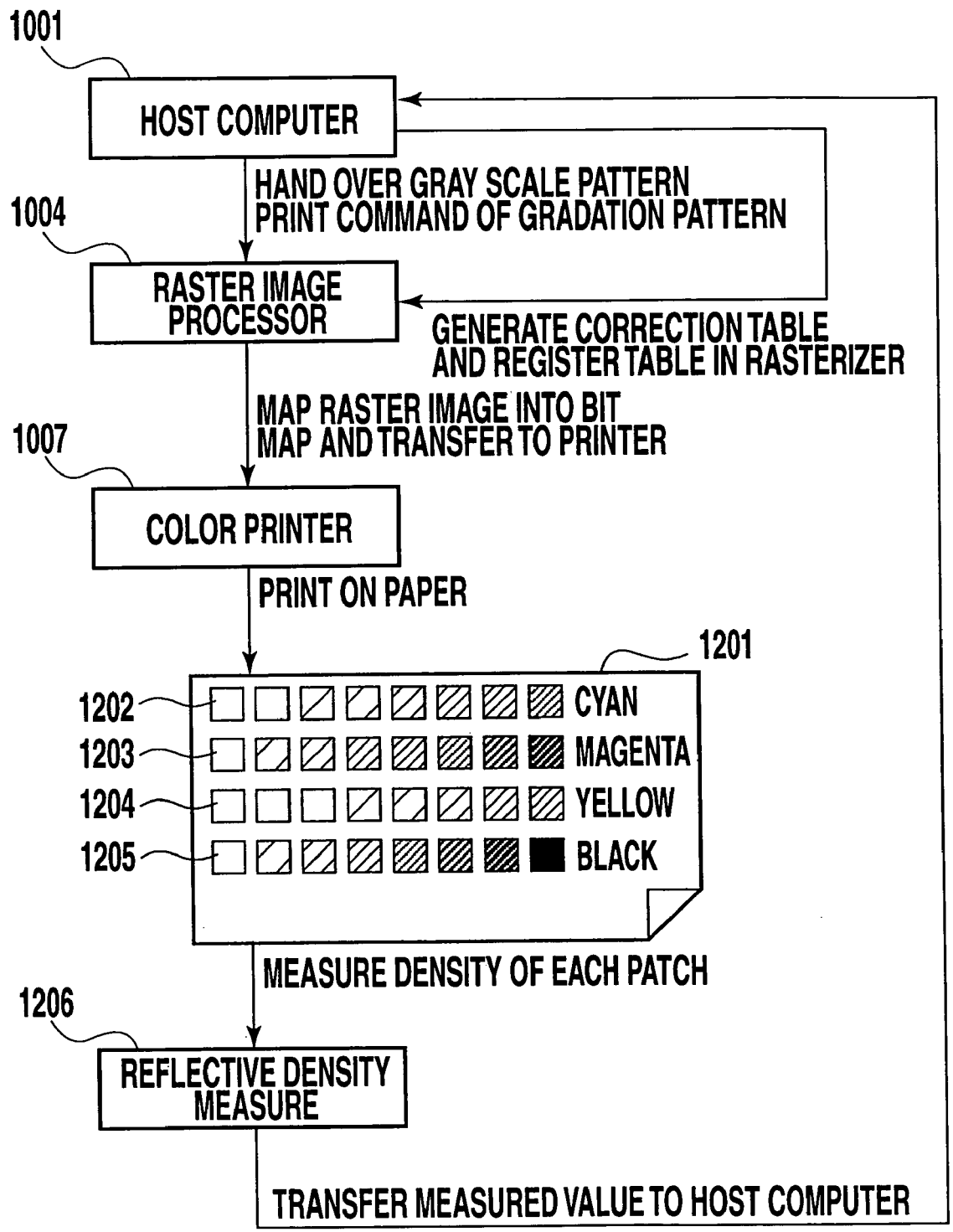
FIG. 3 is an illustration explaining a calibration for a printer performed in the image processing system.
Figure 8:
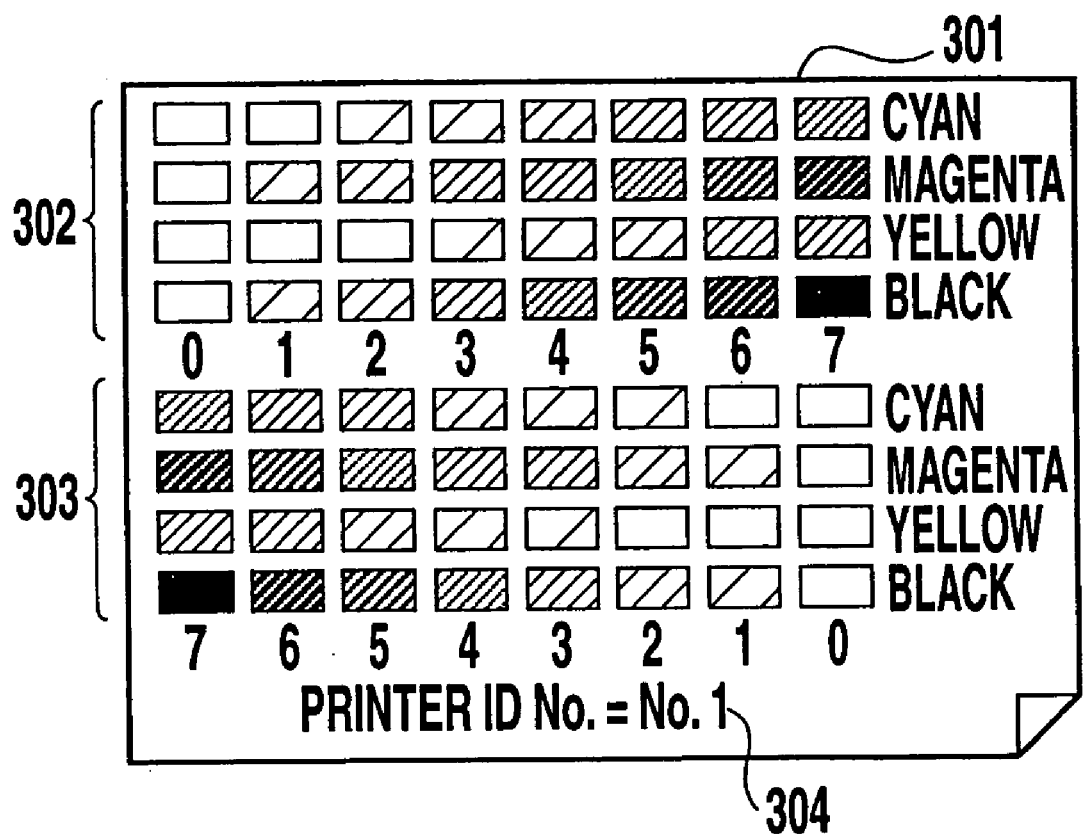
FIG. 8 is an illustration showing a test pattern printed during the calibration according to the embodiment of the present invention.

The gradation pattern output by this embodiment is shown in FIG. 8. Unlike the gradation pattern shown in FIG. 3, the gradation pattern of this embodiment output on paper 301 has an upper-half pattern 302 and a lower-half pattern 303. The upper-half pattern 302 has the same patch pattern as the patches 1202–1205 of FIG. 3, and the lower-half pattern 303 is that obtained by inverting the upper-half pattern 302 laterally, i.e., with the left and right reversed. This is to absorb density variations of the printer and reading characteristic variations of the scanner, as described later.

The paper on which the gradation pattern is printed has a printer identification number 304 printed at the lower part thereof to identify the printer that has printed this gradation pattern. This identification number is automatically printed on paper along with the gradation pattern by that the raster image processor generates the bit map data of the number based on the identification information stored in each printer status memory.

After the gradation pattern is printed, the user picks up the printed gradation pattern sheet 301 from the printer and puts it on the platen glass of the copying machine 102 in a specified orientation. At this time, the operation panel of the copying machine 102 displays an operation display shown in FIG. 7B (step S605). The operation display displayed at step S605 is based on the decision made at step S603. More specifically, the example shown in FIG. 7B displays that both of "No. 1" and "No. 2" printers are selected on the display of the operation panel shown in FIG. 7B.

Reading the Test Pattern

The user instructs the start of the procedure for executing the gradation correction of the printer through the operation panel. More specifically, the user recognizes the printer identification number that is marked on the gradation pattern placed on the platen glass of the copying machine 102, and specifies the printer of the recognized number from the plurality of printers.

Figure 7B:
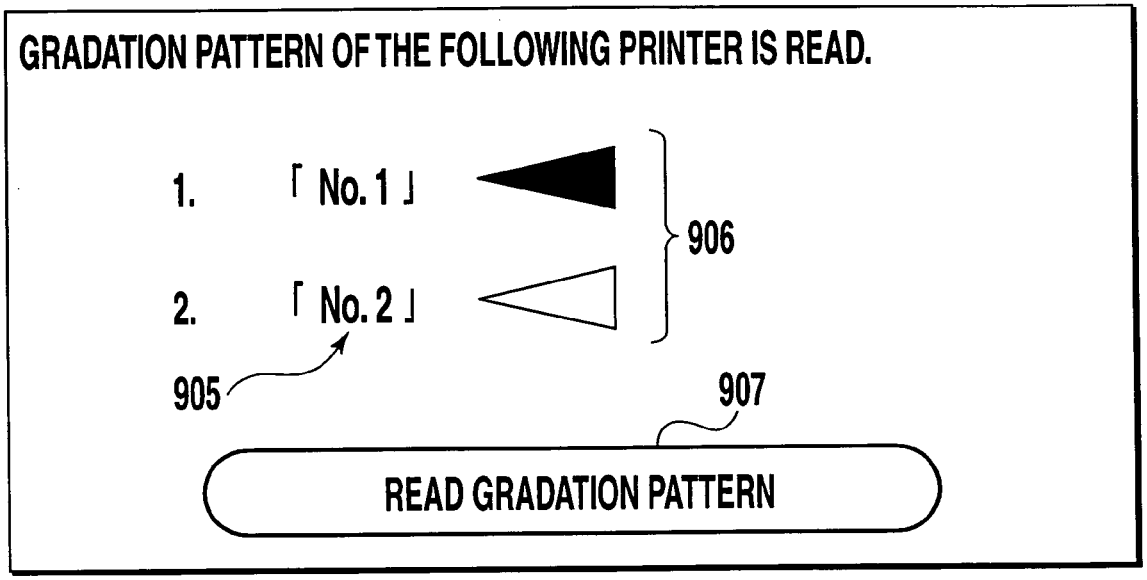

As shown in FIG. 7B, the operation panel displays a list 905 of printers on the network that are available for use, as in the case of FIG. 7A, and also a specifying mark 906 for specifying the printer by which the gradation pattern to be read has been output. When the user does the specification operation by touching the mark 906, the selected mark turns into a black solid mark. The example shown in the figure shows that the "No. 1" printer has been specified. Since the scanner unit of the copying machine 102 can read only one gradation pattern sheet at one time, two or more printers cannot be specified simultaneously.

When the above printer specification procedure is completed, the user presses a "Read gradation pattern" button 907 on the same display to instruct the execution of the gradation correction.

When it is decided that the printer has been selected and reading the gradation pattern also instructed (step S606), the CPU 112 executes reading of the gradation pattern through the controller 111. At first, the CPU instructs the color scanner unit A to read the gradation pattern on the sheet 301 placed on the platen glass. The color scanner unit A performs reading as described above referring to FIG. 5 and sends the read image data to the image memory 110 (step S607).

The image data read is stored temporarily in the image memory 110. The CPU 112, as detailed below, analyzes the image data to obtain the density value of each patch, generates a correction table based on the density values obtained (step S608), and registers the correction table in the status memory of the specified printer through the network (step S609). For example, when the printer identification number printed on the sheet on which gradation pattern is printed is "No. 1" and the "No. 1" is specified by the user through the operation unit, the correction table in the status memory 116 of the color printer 103 is updated.

If there is any other printer selected at step S603, the processing following the step S607 is repeated according to the request for read by the user (step S610).

Apparent from the above description of the embodiment, when executing the calibration, the user can perform all operations, except for picking up the sheet of the gradation pattern from the printer, through the copying machine. Further, the user needs only perform the instruction operation according to the instructions displayed on the operation panel of the copying machine. The user therefore can easily perform the calibration for the printers connected to the image processing system. Further, because the copying machine itself performs processing related to the calibration, as shown in FIG. 6, a load on the host computer can be decreased.

While the correction table made by the copying machine has been described to be sent to the corresponding printer for registration, it is possible to register the correction table in the host computer depending on the system configuration.

Generation of Correction Table

A detail process of generating the correction table described above will be discussed as follows.

Figure 9A:
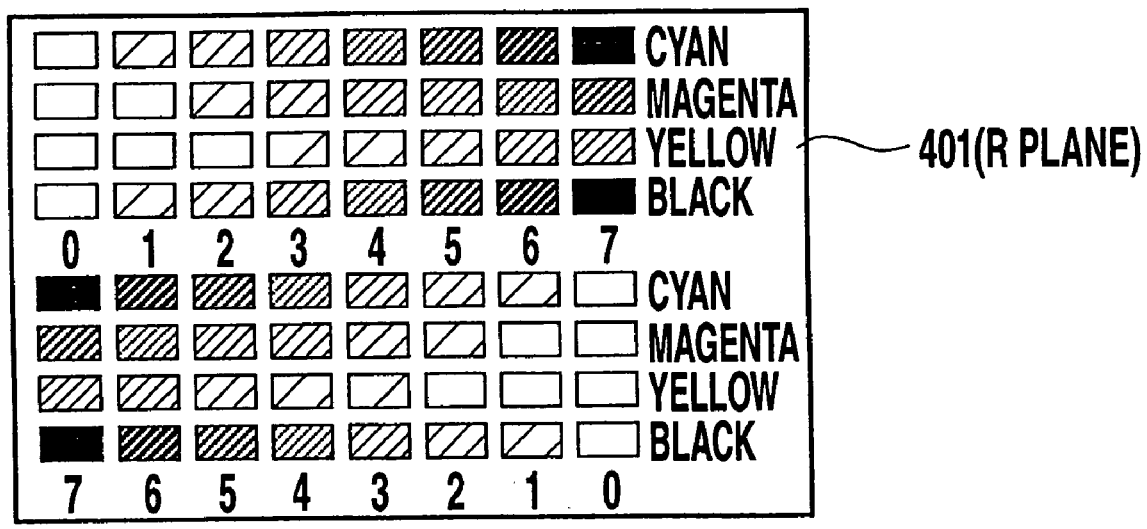
FIGS. 9A, 9B and 9C are illustrations showing read data obtained by reading the test patterns for each color.
Figure 9B:
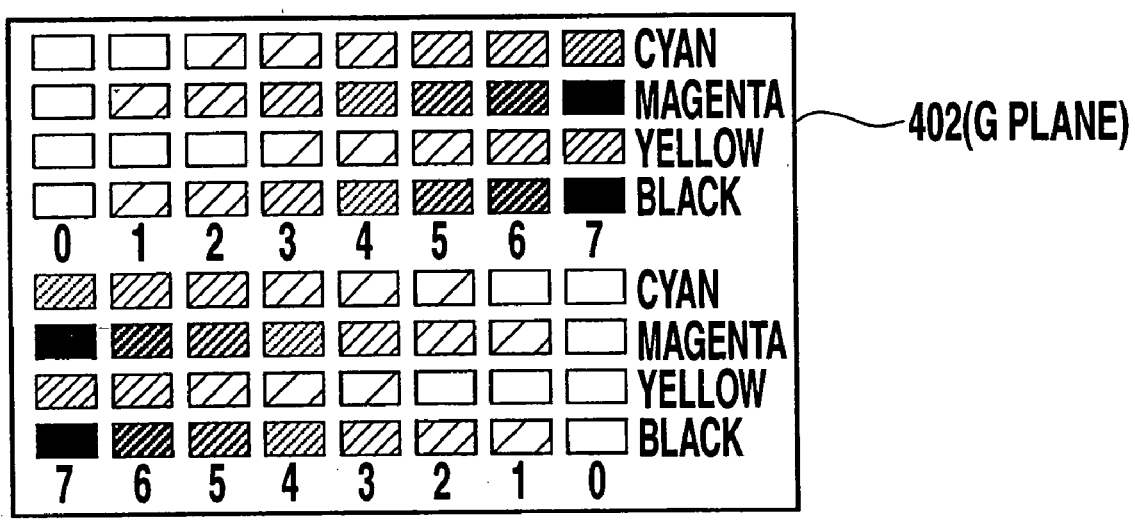
Figure 9C:
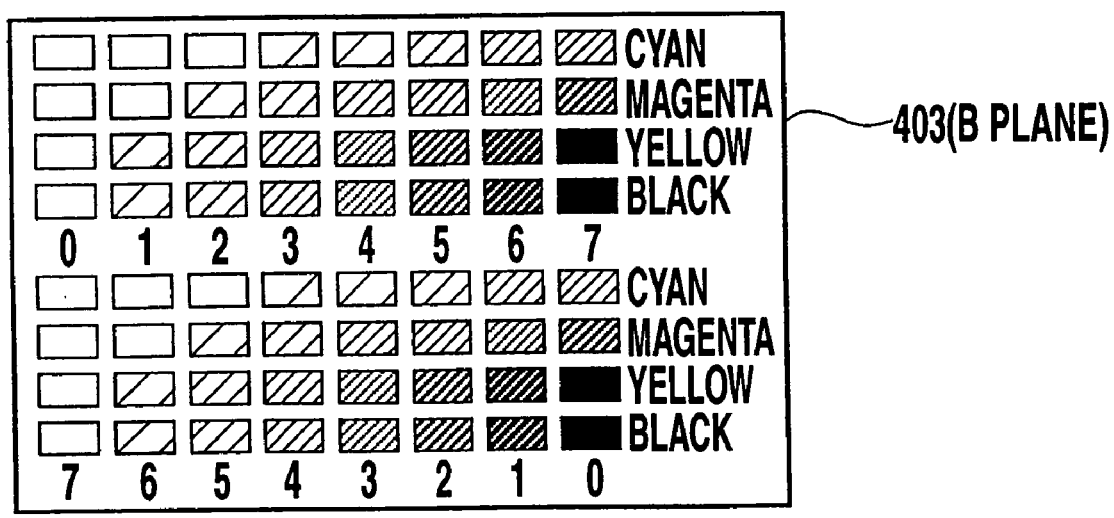

The image data read from the entire surface of the pattern output sheet by the color scanner unit A of the copying machine 102 is decomposed to be bit map images of individual R, G, B color components, as shown in FIGS. 9A–9C. These bit map images are registered in the image memory 110. FIGS. 9A, 9B and 9C schematically show these bit map data, with 9A representing an R plane 401, 9B representing a G plane 402 and 9C representing a B plane.

In these figures, the whiter the area is, the greater the signal value read for that area is. That is, the whiter area represents a lighter (lower density) area. The darker the area is, the smaller the signal value is. That is, the darker area represents an area with higher density. As can be seen from density variation of patches of respective plane in these figures, the R plane 401 indicates that the high density areas of the cyan and black patches are read as high density areas. Likewise, it is seen that the patch densities are read as is for the magenta and black in the G plane 402 and for yellow and black in the B plane 403, respectively. It follows therefore that to measure the density of the cyan patch one should use the data of the R plane 401, that for the measurement of the density of magenta patch the data of the G plane 402 should be used, and that for the measurement of the density of yellow patch the data of the B plane 403 should be used. For the measurement of the black patch density, any of the R, G, B planes may be used. In this embodiment, the data of the G plane is used.

Figure 10:
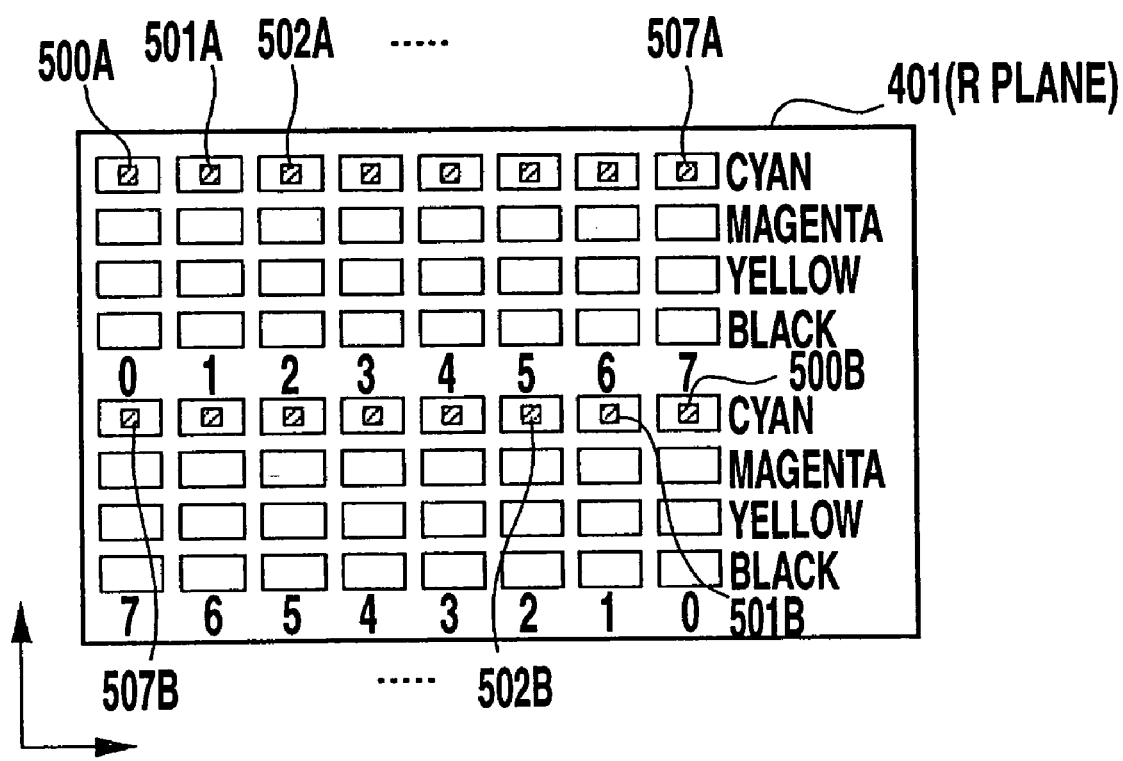
FIG. 10 is an illustration explaining as to how the density of each patch in the test patterns is measured.

FIG. 10 shows read image data of the R plane, which is the same as the plane 401 shown in FIG. 9. In FIG. 10 only rectangles indicating the patch positions are shown, with brightness of each patch omitted.

In the following, the density measuring process will be explained for an example case of cyan patch by referring to FIG. 10. The image data is a set of pixel values arranged in matrix on two-dimensional x-y coordinates, as shown. The position and size of each patch can be specified with x-y coordinates. The x-y coordinates are determined by the gradation pattern output command sent to the printer when the pattern is printed. Therefor, the coordinate values may be linked with the pattern output command and stored in advance so that the stored coordinate values can be read out when measuring the patch densities.

First, with respect to the lowest density patch of cyan (gradation number 0) at the left end of the row of cyan patches of the upper half pattern, an image pickup area 500A (inside a shaded rectangle) is determined based on the position coordinates of the left end patch and the image data S(x,y) of the shaded rectangle is read. The data S(x,y) of the pixel value is generally represented as a digital signal of 8 bits or so and is assumed here to have an integer value between 0 and 255.

The data S(x,y) is a set of image data in the area 500A and a total number of the data is determined by the number of pixels contained in the rectangular area 500A. When the number of pixels in the rectangular area in the x direction is Nx pixels and the number of pixels in the y direction is Ny pixels, the total number of data S(x,y) is given by Nx times Ny pixels.

Next, the average Sm of pixel values in the area 500A is determined from the following equation.

$$Sm = \frac{\left(\sum S(x, y)\right)}{N_x \cdot N_y} \tag{1}$$

where Σ represents the sum of the data in the rectangular area 500A. The average value Sm thus obtained represents the average of pixel value of the left end patch with a gradation number 0 in the cyan row of the upper half pattern and is treated as Sc0A below.

Next, the process proceeds to the second patch in the cyan row. In the same way as described above, a rectangular area 501A is determined according to the patch position coordinate information and an average value Sc1A of the pixel value is determined in the similar manner.

This process is repetitively performed on the subsequent rectangular areas 502A, 503A, . . . 507A in that order to obtain average value data Sc2A, Sc3A, . . . , Sc7A.

When the above steps are completed, the process proceeds to the cyan patch row of the lower-half pattern and begins with the right end patch to determine the rectangular area 500B and the average value of the pixel value in the rectangular area. In the lower-half pattern, since the rightmost end patch corresponds to the gradation number 0, its average value is denoted by Sc0B. In the lower-half pattern, too, the similar steps are taken to determine the average value for each area 501B, 502B, . . . , 507B and they are treated as Sc1B, Sc2B, . . . , Sc7B.

The respective pairs of patches 500A and 500B, 501A and 501B, . . . , and 507A and 507B are reproduced based on the respective same gradation levels. Hence, if there are no density variations due to printer output position deviations or reading value variations due to scanner unit reading position deviations, the average value data obtained in each pair must be equal. That is, $$Sc0A = Sc0B$$

$$Sc1A = Sc1B$$

$$\ldots$$

$$Sc7A = Sc7B \tag{2}$$

In the actual, however, the paired average value data are not necessarily equal due to various variation factors, for example, due to the relative low accuracy of the scanner unit or the variation of reading characteristics of the scanner unit of the copying machine. Under the situation where the equation (2) does not necessarily hold, this embodiment assumes that the average of the each paired data is a true patch measurement value.

That is, Sc0, Sc1, . . . , Sc7 are taken to be true patch data, and are expressed by the following formulas $$Sc0 = (Sc0A + Sc0B)/2$$

$$Sc1 = (Sc1A + Sc1B)/2$$

$$\ldots$$

$$Sc7 = (Sc7A + Sc7B)/2 \tag{3}$$

After the average image signal (value) for each patch is determined, they are converted into density values. The image data read by the scanner unit of the copying machine is normally a so-called luminance signal proportional to the reflectivity of original image. To convert the image data into the density value requires an appropriate logarithmic conversion. An example of conversion formula used to express a density value D in an 8-bit integer value is shown below.

$$D = -255 \times \log_{10}(S/255)/2.0 \tag{4}$$

This is a conversion formula that converts the luminance signal S into D=255 when the density of the opriginal is 2.0. When D is 255 or higher, it limits the value to 255.

Using this equation (4), Sc0, Sc1, . . . , Sc7 obtained from equation (3) are converted into density values Dc0, Dc1, . . . , Dc7. That is, $$Dc0 = -255 \times \log_{10}(Sc0/255)/2.0$$

$$Dc1 = -255 \times \log_{10}(Sc1/255)/2.0$$

$$\ldots$$

$$Dc7 = -255 \times \log_{10}(Sc7/255)/2.0 \tag{5}$$

For patches of other colors, magenta, yellow and black, the density values can be determined by the similar procedure. The density values obtained in this manner are taken as Dm0–Dm7, Dy0–Dy7, and Dk0–Dk7.

The conversion into density value described above is not limited to equation (5) and may use other conversion formulas. It is also possible to measure the relation between the luminance signal value and the density value in advance and use it as a lookup table to perform the density conversion.

Figure 11:
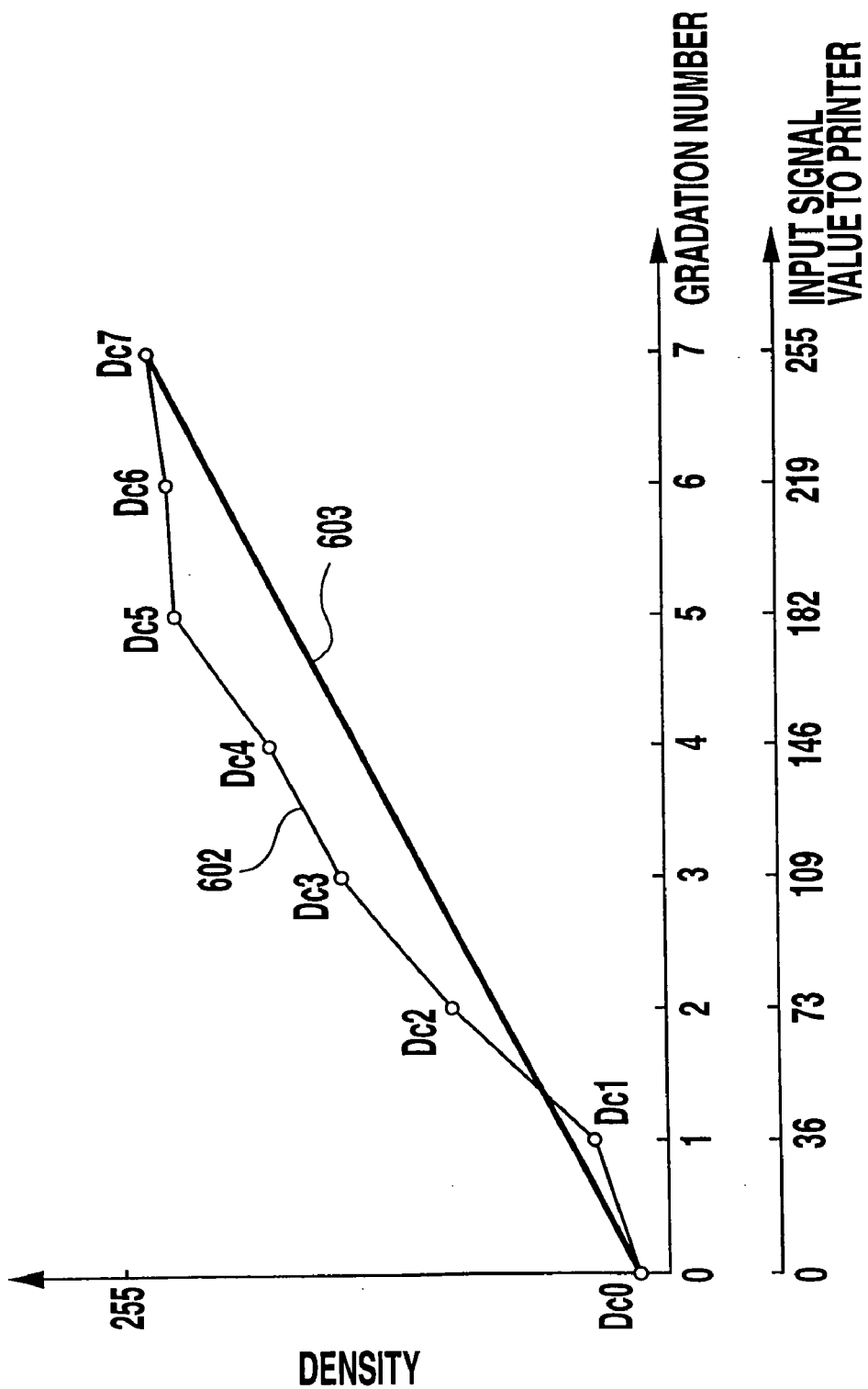
FIG. 11 is a diagram showing the relation between input signal values supplied to a printer and measured density values of an image printed out in response to the input signal, i.e., a diagram showing an output density characteristic of the printer.

FIG. 11 is a diagram where the density values Dc0–Dc7 of cyan patches obtained as described above is plotted in one-to-one correspondence with the gradation number of the patch. In the figure the abscissa represents the gradation number and ordinate represents the density value. The points marked with a circle indicate measured density values and a curve 602 is a line made by connecting these measured values.

Preferably, the density values of the patches specified by the gradation numbers 0–7 should be measured to be values corresponding to eight signal values that are obtained by choosing at equal intervals the values of 0–255 represented by an 8-bit signal entered into the printer as the image forming unit. More specifically, ordinary printers receive an 8-bit signal for each color C, M, Y and K and, based on this signal value, perform known processing, such as digitization using an error diffusion method or a dither method and laser emitting time modulation for exposing the photosensitive body of the electro-photographic system, to form dots on paper thereby printing out an image having the density gradation. In this embodiment, the patches of the gradation numbers 0–7 are output based on the signal value that is obtained by choosing at equal intervals the 8-bit signal a range of which exists between 0 and 255. Therefor, there is a following relationship in relation to the abscissa of FIG. 11.

Gradation number 0=Input signal value 0
Gradation number 1=Input signal value 36
Gradation number 2=input signal value 73
Gradation number 3=input signal value 109
Gradation number 4=input signal value 146
Gradation number 5=input signal value 182
Gradation number 6=input signal value 219
Gradation number 7=input signal value 255

In FIG. 11, a thick line 603 represents an example of an ideal reference density characteristic of the printer, in which the measured density values of the patches are that should be realized in response to the input signal value. That is, the printer should preferably have a linear output density characteristic proportional to the input signal value. However, there is generally no linear correspondence between a color space of the printer's input signal value and an output color space of the printer. Therefore, the input signal value in general is corrected by using a lookup table and an interpolation calculation. Depending on factors, such as printer degradation with elapsing time and environmental changes, however, the lookup table may become inappropriate, resulting in a non-linear output density characteristic as indicated by the curve 602 of FIG. 11. The calibration is carried out to correct such an output density characteristic into the straight line 603 by modifying the content of the lookup table.

In this embodiment, the lookup table is used by the raster image processor in the printer to rasterize the PDL command to generate a bit map image of input signal values for each color C, M, Y, K. A correction table obtained based on the above described density measurement values is generated in the copying machine and transmitted to the printer to make it the content of the lookup table.

More specifically, the content of the lookup table needs to have a characteristic inverse to the characteristic of the curve 602 of FIG. 11. Based on the measured density values, the CPU 112 of the copying machine 102 calculates the correction table having such a characteristic for each color C, M, Y, K. Then, the CPU transmits the calculated correction tables to the printer subjected to the calibration so as to update the lookup table stored in the status memory with the content of the correction tables.

Figure 12:
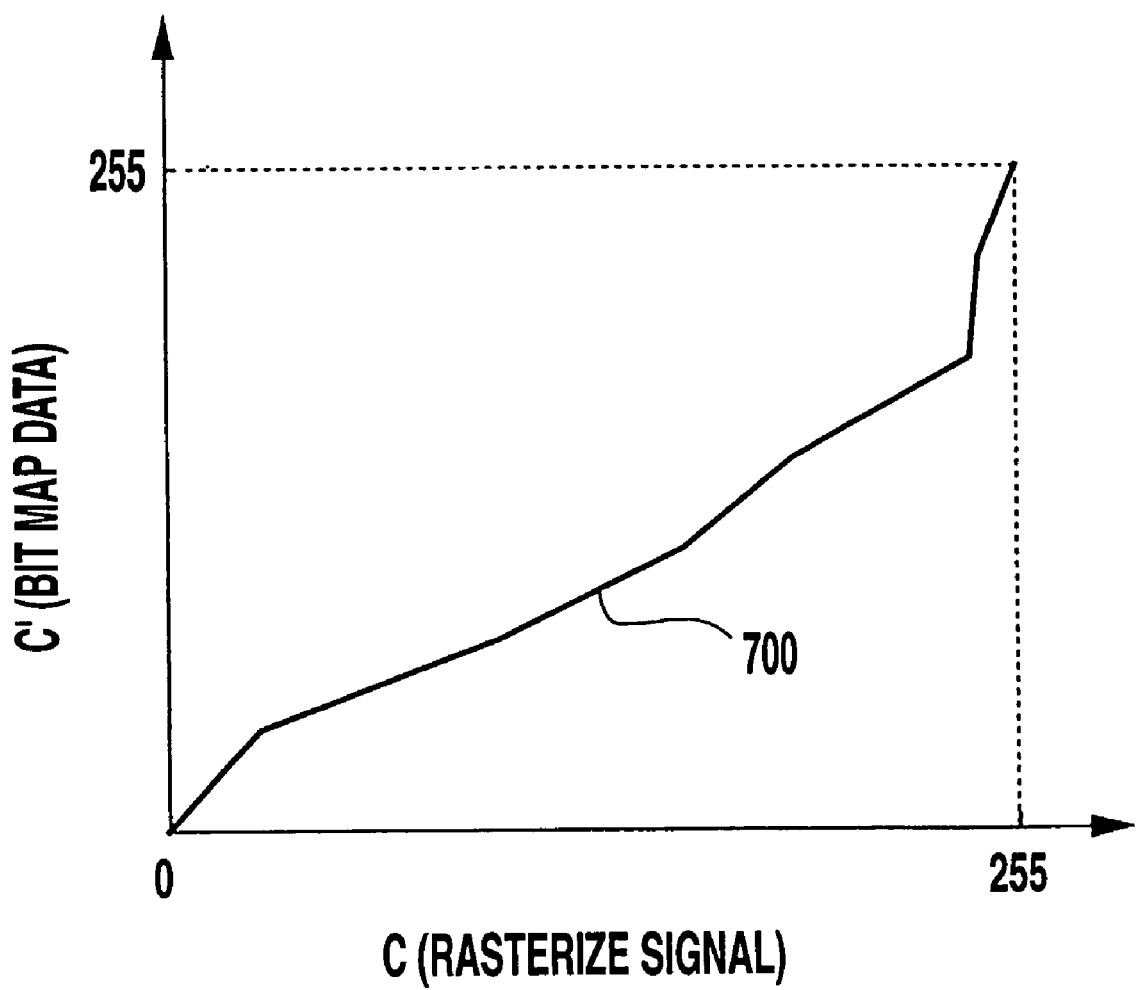
FIG. 12 is a diagram showing a characteristic of a correction table (a lookup table) for correcting the output density characteristic.

FIG. 12 is a diagram schematically showing the content of the lookup table updated by the calibration. In the figure a curve 700 schematically represents the lookup table which is expressed as the relation between the density value of the data obtained by rasterizing the PDL command and the density value of the bit map data. This curve shown in FIG. 12 has a characteristic symmetrical to the curve 602 of FIG. 11 with respect to the line 603. For usual printing the updated lookup table is used to convert the rasterized signal value (C signal in this case) into a signal value (C' signal) to be written into the bit map data.

Figure 13:
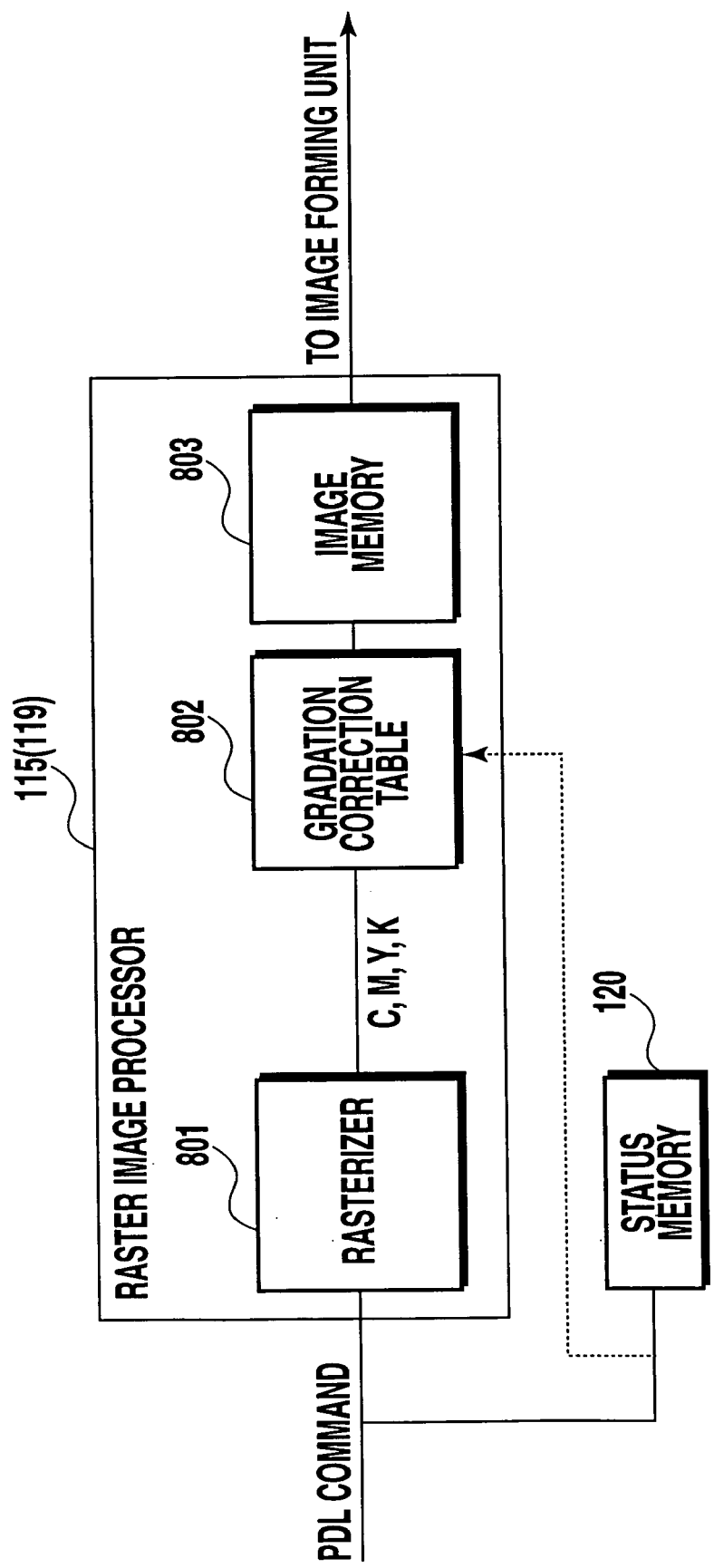
FIG. 13 is a block diagram showing a configuration of a raster image processor in the printer that stores a content of the correction table to correct image data.

FIG. 13 is a block diagram showing a detailed configuration of the raster image processor 115 (or 119, see FIG. 4). The PDL command transmitted from the host computer or the copying machine via the network interface is developed into a bit map image for each color C, M, Y, K by a rasterizer 801 and stored in an image memory 803. During this process, the bit map images are corrected by a gradation correction table (the lookup table described above) 802. In the above description, the gradation correction table (700 in FIG. 12) generated by the CPU of the copying machine is transmitted through the network and stored temporarily in the status memory 116 (120) in the printer. During the rasterization for the PDL command, the correction table in the status memory is read out and set in the table 802.

In the above configuration, when the image forming unit forms an image with binary values, i.e., forming or not forming of each dot, as in the ink jet system for example, the C' signal is subjected to known pseudo half-toning processing such as dithering before being written into the image memory 803.

Although, in the example shown in FIG. 13, the gradation correction table (lookup table) is executed as a previous step for the image memory, it may be put behind the memory and execute the gradation correction at the same time that the data is sent out to the image generation unit.

According to the embodiment described above, at the copying machine connected to the image processing system through the network, a user can performs an operation with respect to the calibration for other printer with simple operations through the operation panel. Thereby, an appropriate image output can be always realized without being affected by degradation of printing characteristic with elapsing time and change in characteristics of units composing the printer. Further, the patch pattern subjected to the density measurement is printed so that the same two patch patterns are formed and these same two patterns are arranged in an inverted manner where directions of the respective two patterns have opposite directions. In addition, the gradation correction table is obtained by using the average of respective two measured density of same gradation number between the two patch patterns. This patch pattern compensates for degradation of reading preciseness and variation of reading characteristics of the scanner unit, and thereby the precision of density measurement is improved, leading to higher accuracy of the calibration.

Furthermore, the calibration can be done for a plurality of printers simultaneously, so differences in hue, especially due to change of printing characteristics with time lapsing, between the plurality of printers can be eliminated effectively.

Second Embodiment

In the first embodiment described above, the user puts the sheet of the test pattern (gradation pattern) printed out by the printer on the platen glass of the copying machine. The test pattern sheet may also be placed on the document feeder 201A shown in FIG. 5 for reading the test pattern.

Figure 7C:
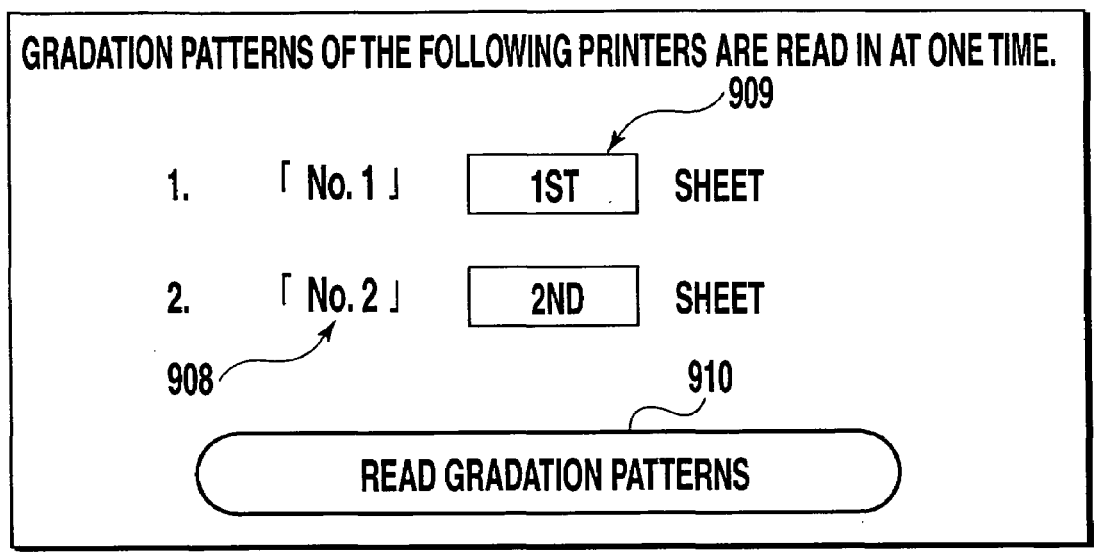

In these reading structure, a plurality of pattern sheets output from the respective color printers all may be set on the document feeder 201A for test pattern reading. This allows a plurality of printers to be calibrated with a single series of operations. In this case, the test patterns printed and the printers that have printed out them should be related to each other. Therefor, the identification codes (304 in FIG. 8) printed on the pattern sheets are input in the order in which the pattern sheets are stacked up on the feeder, before reading of the patterns on the plurality of pattern sheets at one time. An example display on the operation panel in this case is shown in FIG. 7C. In to a corresponding display field 909 with the available printer specified by an identification number 908, information, which shows as to order at which the corresponding gradation pattern sheet is stacked up, is entered by using ten keys and the like. After entering the information, the user presses a gradation pattern read button 910 to start reading the test pattern sheets.

Further, the above procedure by the user may be eliminated by adopting a method in which the printed identification number for identifying the printer is extracted for OCR (optical character recognition) processing from the image data stored in the image memory by reading the test pattern with the scanner unit of the copying machine, so as to obtain the identification number automatically.

This eliminates the need to input through the operation unit the printer identification information corresponding to each of the test patterns, and thus makes it possible to read the plurality of gradation patterns at one time to automatically execute the gradation correction for the plurality of printers according to the respective corresponding patterns.

While in the above example the printer is identified by recognizing a row of printed symbols, known bar codes may be used instead of the symbol row to produce the similar effect. In that case, a particular printer can be identified by extracting and recognizing the bar code printed on the test pattern sheet and then converting it into the row of characters represented by the bar code. Further, as the identification information, an identification number identifying the network interface of the printer or a network address such as an IP address for the printer may be used as well as a code number identifying the printer, instead of the symbol series or the bar code.

Third Embodiment

This embodiment is a variation of the first and second embodiments described above. In the preceding embodiments the output of the test pattern is instructed no matter what state each printer is, as described referring to FIGS. 6 and 7. Hence, if the printer for which the calibration has been instructed is executing a print job, the test pattern cannot be output until the print job is finished. In that case, it is not easy to know when the test pattern for the calibration will be output or if the test pattern has already been output.

This embodiment provides an improvement on this point of view. The processing carried out in this embodiment will be explained by referring to FIGS. 14A–14C.

Figure 14A:
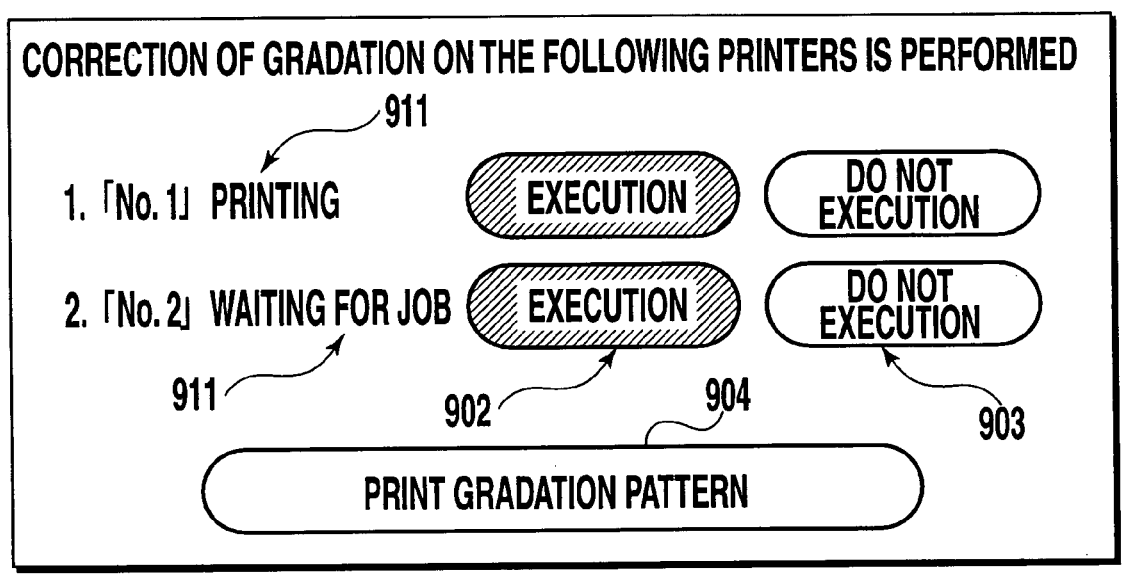
Figure 14C:
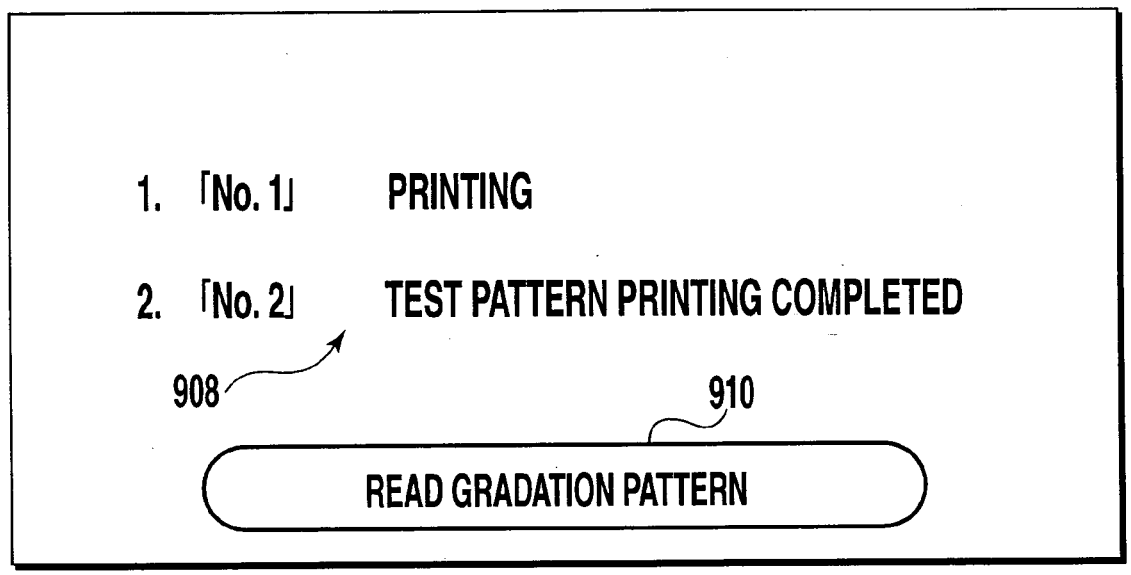

FIGS. 14A–14C schematically show operation displays associated with the calibration of this embodiment. Although in this embodiment the display shown in FIG. 14A on the operation panel that corresponds to that shown in FIG. 7A differs from that of FIG. 7A, the basic operation is similar to those of the preceding embodiment.

The processing associated with the operation displays shown in FIGS. 14A–14C is performed by steps S602–S604 shown in FIG. 6. The operation display of FIG. 14A performs an indication display 911 indicating the state of each printer ("printing" which means that the printer is printing according to other print job; "error" which means that printing cannot be done because of paper jamming, toner running out or the like; and "waiting for job" which means that the printer is waiting for an instruction). Based on the indicated state of the printer, the user can specify a desired printer for the gradation correction. When the printer selected is in the state of "waiting for job", the test pattern can be output immediately. On the other hand, when the printer selected is in the state of "printing", the test pattern cannot be printed until the current job is finished.

In the example shown, when selecting "No. 1" printer, the display of FIG. 14B is performed and thereby the user knows the detail of job situation of the printer "No. 1" (document name, status, owner (person who requested the job), and job progress). That job situation can be obtained by the CPU 112 of the copying machine checking the status memory for each printer via the network.

When through the operation panel shown in FIG. 14A the printing of the test pattern is instructed ("Execution" 902 is selected), a display of FIG. 14C is performed. FIG. 14C shows the display showing the output status of the test pattern of each printer. The test pattern output states are also obtained by the CPU 112 of the copying machine in a way similar to that in which the job situation is obtained.

According to this embodiment, the displays of FIGS. 14B and 14C show the status of each printer, so that the user can decide whether or not to perform the gradation correction according to the printer state. More specifically, the user can select a printer for the gradation correction based on a judgement as to when the test pattern will be output. Therefore, when the user cannot wait for the completion of the current job, he or she can avoid performing the gradation correction on the printer that is executing the job. When it is necessary to perform the gradation correction to reproduce color with high precision, it is possible to instruct the printer to output the test pattern after the current job is finished.

Because the output state of the test pattern can be checked on the display of FIG. 14C, the user does not have to go to the printer to confirm the test pattern output.

According to this embodiment, the copying machine obtains detailed information from the printers through the network and notifies the information to the user, thus providing the user with a user friendly operating environment.

In the above three embodiments, all of the calibration process (gradation correction process) for the color printers has been described to be performed under the control of the CPU of the copying machine. Instead of this configuration, it may be possible to perform only the reading of the test pattern image by the color scanner unit of the copying machine and transmit the image data obtained by reading to the host computer where the image data undergoes subsequent processing by software on the computer. This offers an advantage of being able to make density measurements of patches by using the scanner unit of the copying machine connected to the network without using an expensive optical density meter. Further, the precision of the calibration can be prevented from being decreased as described above although the scanner unit of the copy machine is used.

Alternatively, the processing up to the step of determining the density value of the output patch from the image data in the image memory may be performed by the copying machine, and the density characteristic thus obtained may be transmitted to the host computer which executes the subsequent processing. Such a sharing of processing can be performed in a variety of ways. It is apparent that the present invention can be applied to whichever of these sharing cases.

Further, flat bed scanners connected to the system through the network, for example, can be used instead of the color scanner of the copying machine. In that case, the software associated with calibration procedure can all be installed and executed on the host computer.

Further, although the above embodiments have used the correction table as the image processing conditions of the color printer, other image processing conditions may also be used. For example, it is possible to multiply the rasterized image with a predetermined multiplication coefficient or perform addition or subtraction on an offset coefficient and set this coefficient for each printer. Or the process condition of the image generation unit (for example, bias voltage or voltage contrast in the electro-photographic system) may be controlled.

Furthermore, although the printers are assumed to use coloring materials of four colors C, M, Y and K, only three colors C, M and Y or a single color of black may be used without degrading the applicability of the invention.

Other Embodiments

The present invention may be applied to a system consisting of a plurality of devices (such as a host computer, an interface device, a reader and a printer) or to single device (such as a copying machine and a facsimile). The present invention also includes a configuration in which a computer in an apparatus or system, which is connected with a variety of devices so as to realize functions of the foregoing examples shown in FIG. 6 is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magneto-optical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

As described above, according to the embodiments of the present invention, when performing a calibration for an image outputting apparatus such as a printer connected to a network system, a user can specify through a display for an operation of a copying machine or a host computer the image outputting apparatus to be calibrated and cause the specified image outputting apparatus to output a test pattern. Further, the test pattern printed by the image outputting apparatus can be read by a reading means of the image outputting apparatus and, based on the test pattern read, the image outputting apparatus by which the test pattern is printed can be calibrated. Therefore there is no need to use a separate density measuring device to measure the density of the test pattern. Nor is it necessary to take a troublesome step of reading the test pattern with a separate scanner and transferring the read data into the image processing apparatus. Further, if the scanner is placed at a relatively remote location, the user is not required to go there for a reading operation.

As a result, the calibration for the image output apparatuses such as printers can be done easily.

The present invention has been described in detail with respect to preferred embodiments, and it will now be more apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. A copying machine including an image reading unit and an image output unit for printing an image read by the image reading unit, said copying machine comprising:
   a network interface for connecting said copying machine to a network;
   search means for searching a plurality of image output apparatuses connected to the network;
   obtaining means for obtaining a state of each image output apparatus;
   operation means for displaying a plurality of searched image output apparatuses and a state of each searched image output apparatus, for inputting a user instruction according to the displayed states for selecting an image output apparatus, for which calibration is to be performed, from the displayed plurality of image output apparatuses, and for displaying an output status of a predetermined test pattern of the selected image output apparatus;
   pattern output means for causing the selected image output apparatus to output the predetermined test pattern;
   correction data generation means for generating correction data for the selected image output apparatus, based on test pattern data obtained from said image reading unit which reads the predetermined test pattern outputted by the selected image output apparatus; and
   setting means for setting the generated correction data as correction data for the selected image output apparatus.

2. A copying machine according to claim 1, wherein said setting means registers the correction data generated by said correction data generation means in the image output apparatus through the network.

3. A copying machine according to claim 1, wherein at least one image output apparatus, which is connected to the network, performs printing by means of an electro-photographic system.

4. A copying machine according to claim 1, wherein at least one image output apparatus, which is connected to the network, performs printing by means of an ink jet system.

5. A copying machine according to claim 1, wherein the predetermined test pattern includes a plurality of patterns each of which consists of a plurality of units for reading, each unit differing in an image output condition, and units having the same image output condition between the plurality of patterns have different relative positions in the predetermined test pattern.

6. A copying machine according to claim 1, wherein said pattern output means causes the plurality of image output apparatuses selected by said operation means to output respective predetermined test patterns at the same time.

7. A copying machine according to claim 1, wherein said pattern output means causes the plurality of image output apparatuses selected by said operation means to output the predetermined test pattern and identification information for identifying each image output apparatus outputting the predetermined test pattern together.

8. A copying machine according to claim 7, wherein said correction data generation means specifies an image output apparatus according to the identification information and controls an image output condition of the image output apparatus specified.

9. A copying machine according to claim 8, wherein said image reading unit reads respective predetermined test patterns outputted by the plurality of image output apparatuses at one time and said correction data generation means specifies the image output apparatus according to the identification information read together with the predetermined test pattern.

10. A copying machine according to claim 9, wherein the identification information includes a series of symbols as the identification information.

11. A copying machine according to claim 9, wherein the identification information includes a barcode as the identification information.

12. A copying machine according to claim 9, wherein the identification information includes a network address of the image output apparatus connected to the network.

13. A copying machine according to claim 1, wherein said operation means searches the plurality of image output apparatuses, and displays identification information for identifying the image output apparatuses in a list formation, wherein the image output apparatus is selected from the displayed list.

14. A copying machine including an image reading unit and an image output unit for printing an image read by the image reading unit, said copying machine comprising:
- a network interface for connecting said copying machine to a network;
- a search section adapted to search a plurality of image output apparatuses connected to the network;
- an obtaining section adapted to obtain a state of each image output apparatus;
- an operation section adapted to display a plurality of searched image output apparatuses and a state of each searched image output apparatus, to input user instructions for selecting an image output apparatus, for which calibration is to be performed, from the displayed image output apparatuses, and to display an output status of a predetermined test pattern of the selected image output apparatus;
- a pattern output section adapted to cause the selected image output apparatus to output a predetermined test pattern;
- a correction data generation section adapted to generate correction data for the selected image output apparatus, based on test pattern data obtained from said image reading unit which reads the predetermined test pattern outputted by the selected image output apparatus; and
- a setting section adapted to set the generated correction data as correction data for the selected image output apparatus.

15. An image processing method of controlling an image processing apparatus, said method comprising the steps of:
- searching a plurality of image output apparatuses connected to the image processing apparatus via a network;
- obtaining a state of each image output apparatus;
- displaying the plurality of image output apparatuses searched in said search step and a state of each searched image output apparatus;
- inputting user instructions according to the displayed states for selecting an image output apparatus, for which calibration is to be performed, from the displayed plurality of image output apparatuses;
- causing the selected image output apparatus to output a predetermined test pattern;
- displaying an output status of the predetermined test pattern of the selected image output apparatus;
- generating correction data for the selected image output apparatus, based on test pattern data obtained from an image reading unit which reads the predetermined test pattern outputted by the selected image output apparatus; and
- setting the generated correction data as correction data for the selected image output apparatus.

16. A memory medium storing a program readable by an image processing apparatus for implementing a method of controlling the image processing apparatus, the method comprising:
- a search step of searching a plurality of image output apparatuses connected to the image processing apparatus via a network;
- an obtaining step of obtaining a state of each image output apparatus;
- a first display step of displaying the plurality of image output apparatuses searched in said search step and a state of each searched image output apparatus;
- a reception step of receiving an input according to the displayed states from a user for selecting an image output apparatus, for which calibration is performed, from the displayed plurality of image output apparatuses;
- an output step of causing the selected image output apparatus to output a predetermined test pattern;
- a second display step of displaying an output status of the predetermined test pattern of the selected image output apparatus;
- a generation step of generating correction data for the selected image output apparatus, based on test pattern data obtained from an image reading unit, which reads the predetermined test pattern outputted by the selected image output apparatus; and
- a setting step of setting the generated correction data as correction data for the selected image output apparatus.

* * * * *

UNITED STATES PATENT AND TRADEMARK OFFICE
CERTIFICATE OF CORRECTION

PATENT NO. : 6,975,418 B1
APPLICATION NO. : 09/515610
DATED : December 13, 2005
INVENTOR(S) : Kenichi Ohta et al.

It is certified that error appears in the above-identified patent and that said Letters Patent is hereby corrected as shown below:

COLUMN 2
Line 13, "soon." should read --so on.--.

COLUMN 4
Line 24, "one the" should read --one--.

COLUMN 12
Line 39, "Therefor," should read --Therefore,--.

COLUMN 15
Line 63, "performs" should read --perform--.

COLUMN 16
Line 32, "out them" should read --them out--.
Line 33, "Therefor," should read --Therefore,--.

COLUMN 22
Line 10, "A memory" should read --A computer-readable memory--.
Line 25, "is performed" should read --is to be performed--.

Signed and Sealed this

Twenty-sixth Day of September, 2006

JON W. DUDAS
*Director of the United States Patent and Trademark Office*